US009522781B2

(12) United States Patent
Hortig et al.

(10) Patent No.: US 9,522,781 B2
(45) Date of Patent: Dec. 20, 2016

(54) SHUTTLE FOR AUTOMATED WAREHOUSE

(75) Inventors: Philipp J. Hortig, Rockford, MI (US);
Steven M. DeMan, Belmont, MI (US);
Shin Yamashita, Obertshausen (DE);
Lars Hallberg, Frankfurt aM (DE);
Clemens Hummel, Duesseldorf (DE);
Pascal Rehm, Bielefeld (DE)

(73) Assignee: Dematic Systems GmbH, Heusenstamm (DE)

( * ) Notice: Subject to any disclaimer, the term of this patent is extended or adjusted under 35 U.S.C. 154(b) by 1105 days.

(21) Appl. No.: 13/246,160

(22) Filed: Sep. 27, 2011

(65) Prior Publication Data
US 2012/0099953 A1  Apr. 26, 2012

Related U.S. Application Data

(60) Provisional application No. 61/388,252, filed on Sep. 30, 2010, provisional application No. 61/481,438, filed on May 2, 2011.

(51) Int. Cl.
*B65G 1/00* (2006.01)
*B65G 1/04* (2006.01)
*B65G 1/06* (2006.01)

(52) U.S. Cl.
CPC ............ *B65G 1/0492* (2013.01); *B65G 1/065* (2013.01)

(58) Field of Classification Search
USPC ....................................... 414/277, 278, 282
See application file for complete search history.

(56) References Cited

U.S. PATENT DOCUMENTS

| 3,880,299 | A | 4/1975 | Zollinger et al. |
| 5,927,926 | A * | 7/1999 | Yagi et al. ................ 414/280 |
| 6,923,612 | B2 | 8/2005 | Hansl |
| 7,128,521 | B2 | 10/2006 | Hansl |

(Continued)

FOREIGN PATENT DOCUMENTS

| CN | 1749131 A | 3/2006 |
| CN | 201385922 Y | 1/2010 |

(Continued)

OTHER PUBLICATIONS

International Preliminary Report on Patentability from corresponding Patent Cooperation Treaty Patent Application No. PCT/US2011/053825 mailed Apr. 11, 2013.

(Continued)

*Primary Examiner* — Saul Rodriguez
*Assistant Examiner* — Willie Berry, Jr.
(74) *Attorney, Agent, or Firm* — Gardner, Linn, Burkhart & Flory, LLP

(57) ABSTRACT

A warehouse shuttle includes a chassis made up of first and second chassis portions and an article-carrying area between the chassis portions. Pairs of first and second running wheels are provided on the chassis to travel along the runway. One of a pair of arms is mounted to the first chassis portion and the other of the arms is mounted to the second chassis portion and are extendable and retractable to transfer an article between one of the shelves and the article-carrying area. A connector assembly connects the first and second chassis portions and can vary the spacing between the first and second chassis portions thereby varying the spacing between the arms to engage articles of different widths.

21 Claims, 21 Drawing Sheets

(56) References Cited

U.S. PATENT DOCUMENTS

| | | |
|---|---|---|
| 2003/0185656 A1 | 10/2003 | Hansl |
| 2006/0245862 A1 | 11/2006 | Hansl et al. |
| 2009/0074545 A1 | 3/2009 | Lert, Jr. et al. |
| 2011/0008137 A1 | 1/2011 | Yamashita |
| 2011/0008138 A1 | 1/2011 | Yamashita |
| 2011/0142581 A1 | 6/2011 | Freudelsperger |

FOREIGN PATENT DOCUMENTS

| | | |
|---|---|---|
| CN | 101890711 A | 11/2010 |
| EP | 0733563 A1 | 9/1996 |
| EP | 1422169 A2 | 5/2004 |
| EP | 1772400 A1 | 4/2007 |
| EP | 2030938 A1 | 3/2009 |
| EP | 1631521 B1 | 10/2010 |
| EP | 2272787 A1 | 1/2011 |
| EP | 2318293 B1 | 1/2013 |
| JP | 63-165205 | 7/1988 |
| JP | 08-175620 | 7/1996 |
| JP | 08-175621 | 7/1996 |
| JP | 08-324721 | 12/1996 |
| JP | 09-048507 A | 2/1997 |
| JP | 09-240809 | 9/1997 |
| JP | 10-297712 | 11/1998 |
| JP | 11-079321 | 3/1999 |
| JP | 2000159307 A | 6/2000 |
| JP | 2000211706 A | 8/2000 |
| JP | 2003-048604 A | 2/2003 |
| JP | 2004-123240 | 4/2004 |
| JP | 2006-096522 A | 4/2006 |
| JP | 2006103873 A | 4/2006 |
| JP | 2007210773 A | 8/2007 |
| WO | 03019425 A1 | 3/2003 |

OTHER PUBLICATIONS

Karl-Heinz Dullinger, "Beitrag Tagungsband—BVL Kongress 2008 in Berlin," Version 1.1 (Jul. 23, 2008).

International Search Report (Form PCT/ISA/210) and Written Opinion of the International Searching Authority (Form PCT/ISA/237) from corresponding Patent Cooperation Treaty Application No. PCT/US2011/053825, mailed Feb. 7, 2012.

* cited by examiner

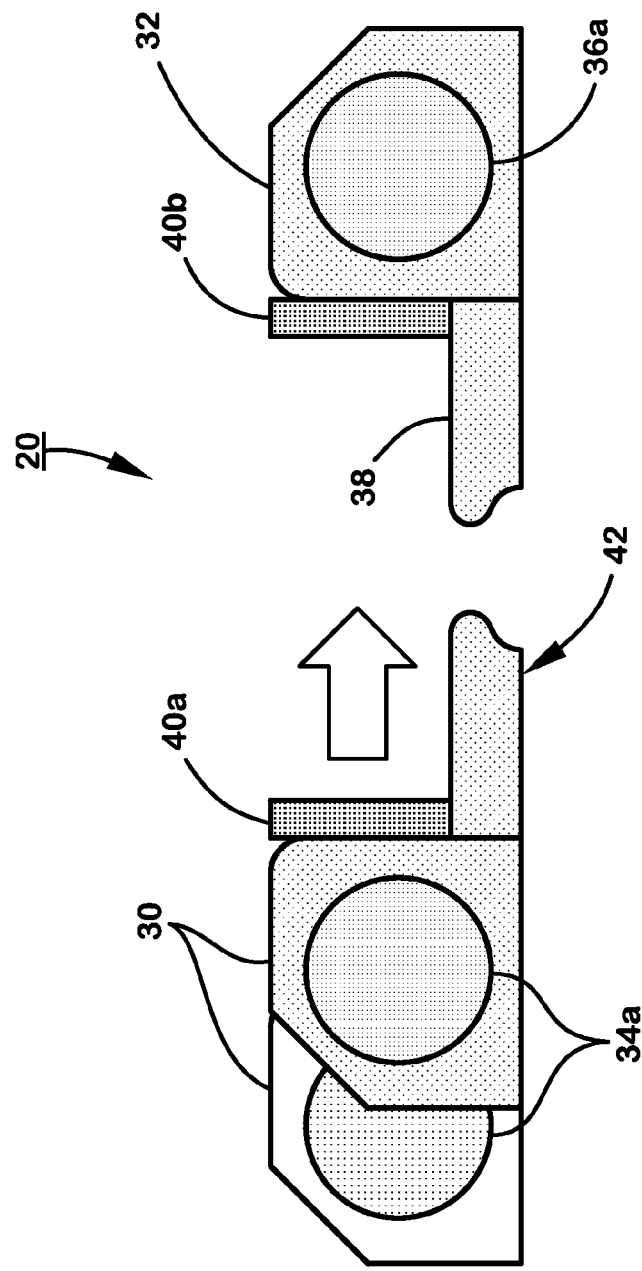

SHUTTLE FOR AUTOMATED WAREHOUSE

CROSS-REFERENCE TO RELATED APPLICATION

This application claims priority from U.S. provisional patent application Ser. No. 61/388,252, filed on Sep. 30, 2010, and U.S. provisional patent application Ser. No. 61/481,438, filed on May 2, 2011, the disclosures of which are hereby incorporated herein by reference in their entirety.

BACKGROUND OF THE INVENTION

A shuttle in a warehouse, such as a three-dimensional warehouse, travels along a runway to deliver articles to article spaces, such as shelves, or the like, extending along the runway and to retrieve articles from the shelves. The shuttle has an article-carrying area and may have a pair of arms to transfer articles between the article-carrying area and the article spaces. Some shuttles are capable of delivering and retrieving articles several articles deep on the article spaces. The arms extend outwardly from the shuttle in a cantilevered fashion quite far into the shelf area thereby experiencing forces tending to cause the arms to sag. This is challenging if it be desirable to handle articles of variable dimensions.

SUMMARY OF THE INVENTION

Various aspects of the present invention provide a shuttle that is robust. In one embodiment, the shuttle is capable of extending its arms and retrieving or delivering an article without undue sag. In another embodiment, the shuttle is able to replenish lines such as lines feeding a picking operation. In another embodiment, the shuttle is in modular form thereby allowing shuttles of various configurations to be made from a common shuttle operation module.

A shuttle, according to an aspect of the invention, is provided for a warehouse, having a runway for the shuttle and a plurality of article spaces along and adjacent to the runway. The shuttle includes a chassis made up of first and second chassis portions and an article-carrying area between the chassis portions. A pair of first running wheels are provided on the first chassis portion to travel along the runway. A pair of second running wheels is provided on the chassis spaced from the first running wheels to travel along the runway. A pair of extendable arms is mounted to the chassis in order to transfer an article between an article space and the article-carrying area. The arms are extendable to transfer an article to or from one of the shelves and are retractable to transfer an article to or from the article-carrying area. A connector assembly connects the first and second chassis portions. One of the arms is mounted to the first chassis portion and the other of said arms is mounted to the second chassis portion. The connector assembly is able to vary the spacing between the first and second chassis portions thereby varying the spacing between the arms to engage articles of different widths.

The connector assembly may include one or more linear actuators extending between the first and second chassis portions. The linear actuator(s) may include a rail that is fixedly connected to one of the chassis portions and is slideably connected to the other of the chassis portions and a continuous belt that travels along the rail. The linear actuator(s) may further include a spacing motor that moves the belt. With the belt being connected to the other chassis portion, operating of the spacing motor causes the belt to move the other of the chassis portions with respect to the one of the chassis portions. If two or more linear actuators are provided, they may share a common spacing motor with a shaft extending from the spacing motor to the linear actuators. The rail(s) of the linear actuators may extend outwardly of the other of the chassis and include a bumper connected to the portions of the rail(s) that extend outwardly of the other of the chassis.

Alternatively, the connector assembly may include one or more rack and pinion assemblies. The rack and pinion assemblies may each include a rack that is fixedly connected to one of said chassis portions and is slideably connected to the other of the chassis portions and a spacing motor. The spacing motor operates a pinion gear engaged with the rack. The spacing motor may operate the pinion gear engaged with one of the racks with a shaft being rotated by that rack extending to the other of the racks.

A drive assembly may be provided for extending and retracting the arms. The drive assembly may include a first drive associated with one of the arms, a second drive associated with the other of the arms, an arm drive motor and another shaft interconnecting the arm drive motor with the first and second drives. A universal joint may be connected with the shaft to accommodate flexing between the first and second chassis portions.

The article-carrying area may include an article support surface between the arms. The article support surface may be expandable and contractible in response to varying of the spacing between the arms. This may be accomplished by the article support surface being defined by a plurality of overlapping plates. At least some of said plates are supported at one side portion by a support bar and at the opposite side portion by resting on an adjacent one of the plates. The support bars may be supported by the connector assembly and joined by a flexible band. The flexible band maintains a maximum spacing between the support bars.

The shuttle may include a control. The control has a first output for effecting rotation of said first running wheels, a second output for effecting extension and retraction of the arms and a third output for effecting spacing between the first and second chassis portions. An encoder may provide an input to the control. The encoder input may be received from the first running wheels or the second running wheels. The control may define a feedback loop to produce the first output. The feedback loop compares a command to travel to a particular position along the runway with the encoder input. In this manner, the feedback loop may be self-compensating for variation in spacing between the first and second chassis portion.

The second running wheels may be mounted to the second chassis portion or the connector assembly.

A shuttle for a warehouse, having a runway for the shuttle and a plurality of article spaces along and adjacent to the runway, according to another aspect of the invention, includes a chassis made up of an operation module and an article-carrying area adjacent the operation module. The operation module includes a set of first running wheels, a motor that is adapted to rotate at least one of the first running wheels, an encoder adapted to sense position along the runway and a controller for receiving external commands and an input from said encoder. The controller produces an output to the motor. A set of second running wheels is provided on the chassis spaced from the first running wheels. The second running wheels are adapted to travel along the runway. A connector assembly connects the operation module and the second running wheels. The connector assembly supports the article-carrying area.

The connector may be made up of a plain tube and/or a rack bar. The connector may include at least two spaced apart plain tubes and an end member joining the plain tubes and supporting the second running wheels. One or more belted sections may be supported by the plain tubes. Each belted section may be a powered conveyor. A divider rail may be provided between the belted sections. The divider rail may be an article-aligning rail. A plurality of article sensors may be provided on the article-aligning rail.

The article-carrying area may include one or more fixed article-carrying platforms. A pair of extendable arms may be mounted to opposite sides of the article-carrying area.

The connector may include a rack bar and further include a carriage module having a pinion assembly that engages teeth in the rack bar to move the carriage module along said rack bar. The connector may include at least two spaced apart rack bars. The pinion assembly may include at least two pinion gears, each engaging one of the rack bars, a drive shaft coordinating the pinion gears and a drive motor that is operable to rotate the pinion gears.

A pair of extendable arms may be provided, one mounted to the operation module and one to the carriage module. A common shaft may extend between the arms and be rotatable to extend and retract the arms. Another motor may be provided at the operation module that is operable to rotate the common shaft.

An operation module for use with a shuttle for a warehouse having a runway for the shuttle and a plurality of article spaces along and adjacent to the runway, the shuttle having an article-carrying area, a connector assembly and a pair of running wheels, wherein a connector assembly supports the article-carrying area, according to another aspect of the invention, includes a housing, another pair of running wheels at the housing and a motor at the housing. The motor is adapted to rotate at least one of the another running wheels, an encoder at the housing that is adapted to sense position along the runway and a controller at the housing. The controller is adapted to receive external commands and an input from the encoder. The controller is adapted to produce an output to the motor. An interface is provided that is configured to engage the connector assembly. The operation module is adapted for use with a variety of different connector assemblies.

These and other objects, advantages and features of this invention will become apparent upon review of the following specification in conjunction with the drawings.

BRIEF DESCRIPTION OF THE DRAWINGS

FIG. 1a is a side elevation of a generalized diagram of the shuttle in FIG. 1;

DESCRIPTION OF THE PREFERRED EMBODIMENT

Figure 1:
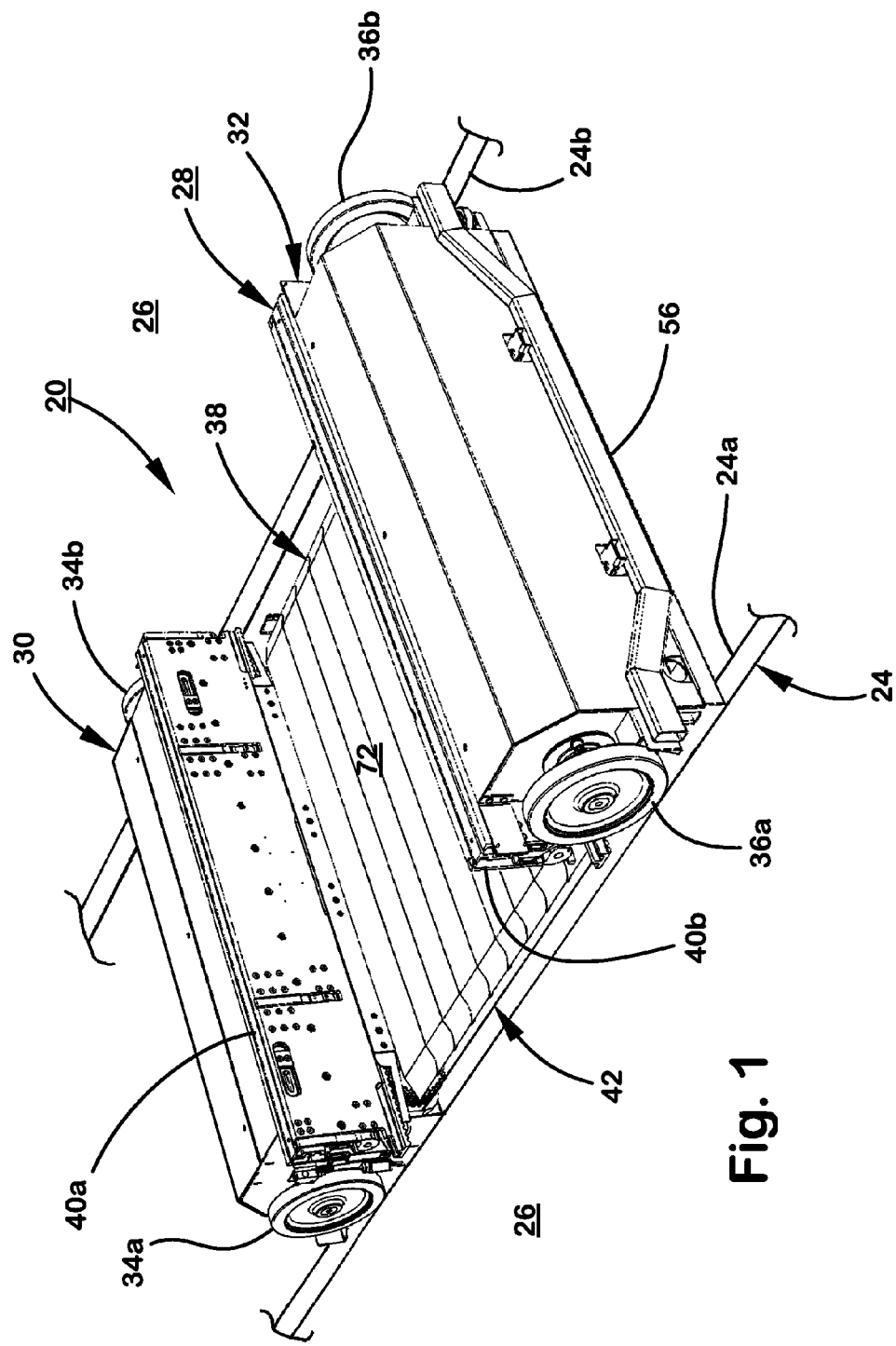
FIG. 1 is a perspective view showing a shuttle in a warehouse according to an embodiment of the invention.
Figure 2:
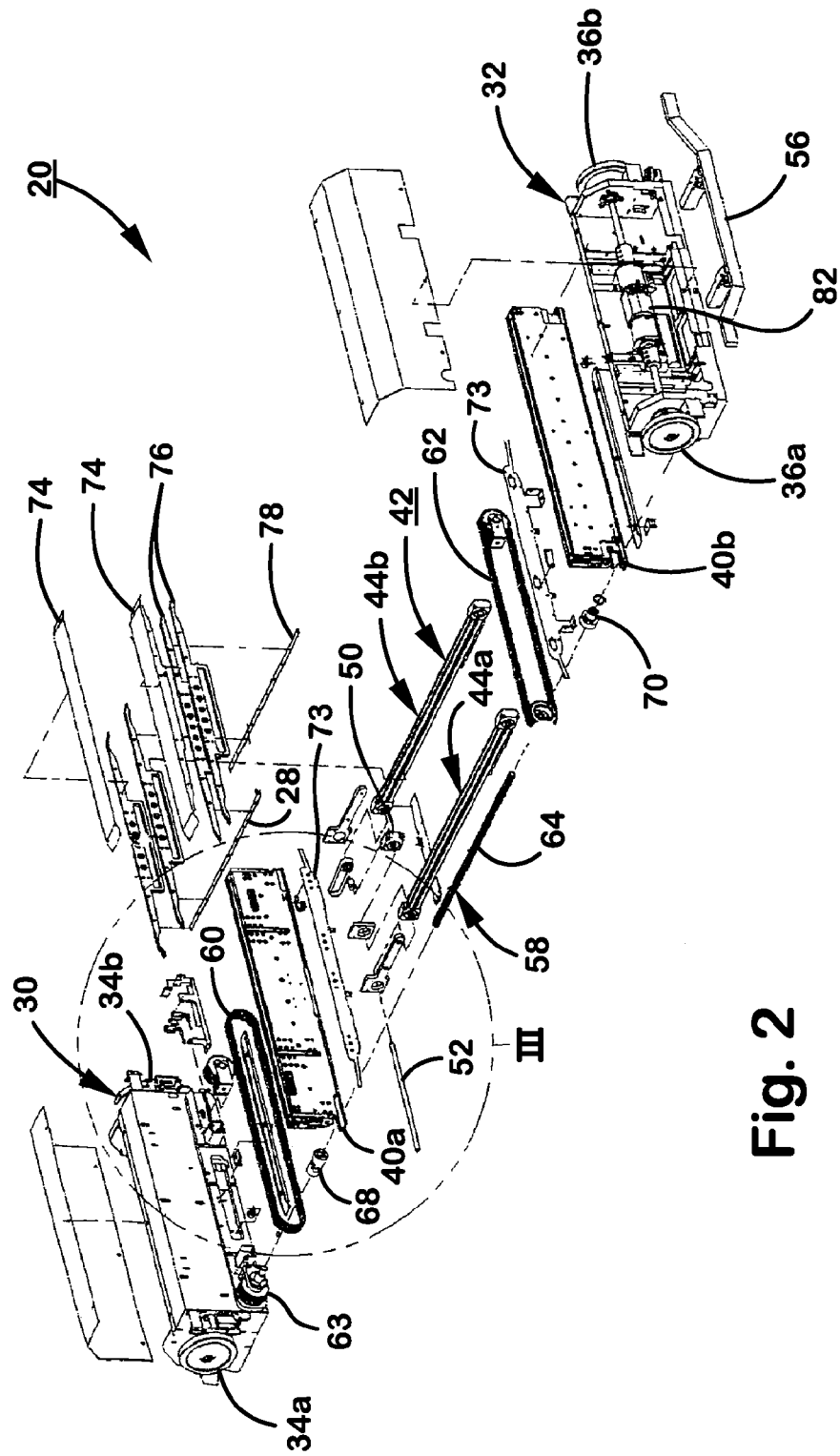
FIG. 2 is an exploded perspective view of the shuttle in FIG. 1.
Figure 3:
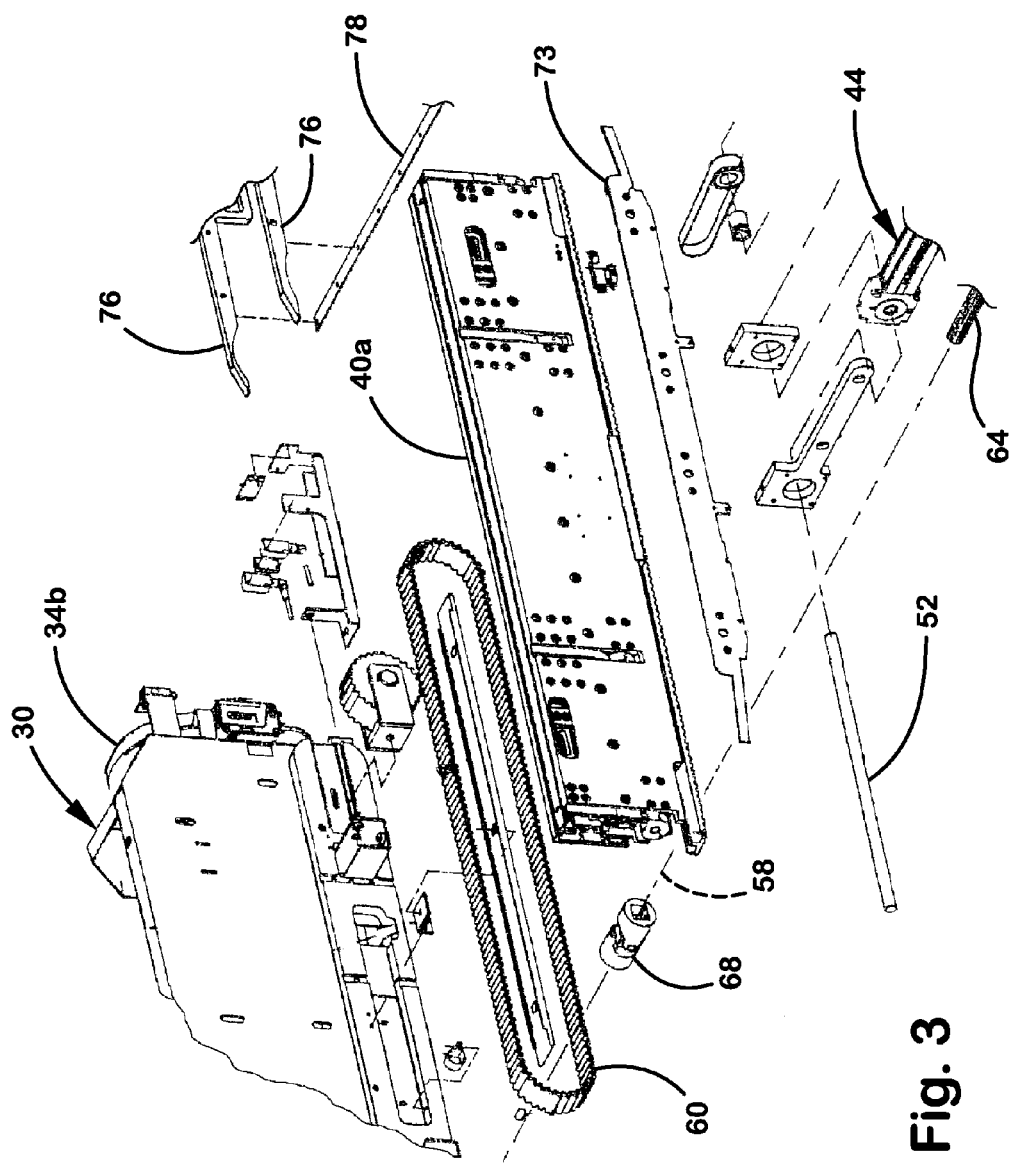
FIG. 3 is an enlarged view of the area designated III in FIG. 2.
Figure 4:
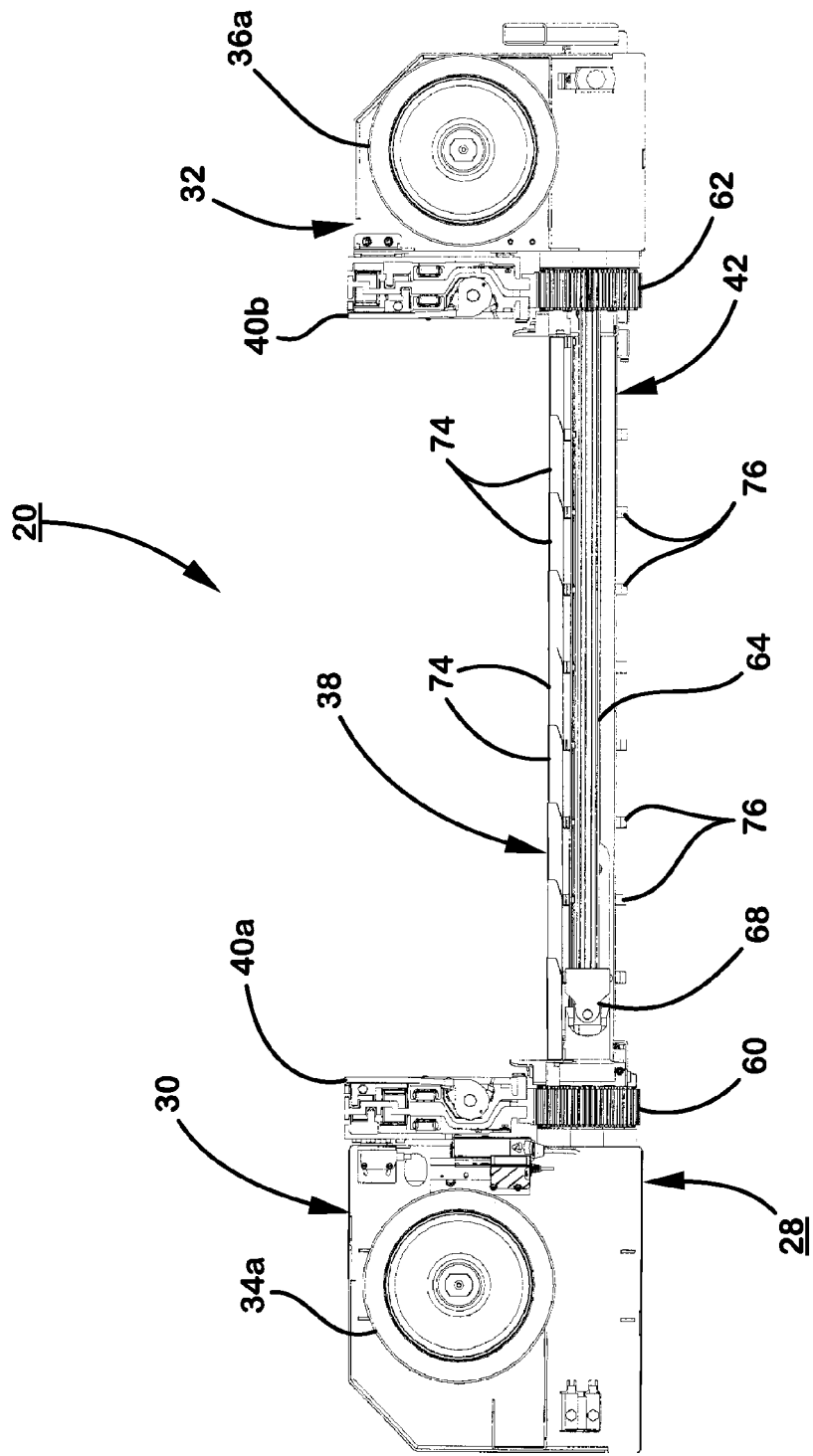
FIG. 4 is a side elevation of the shuttle in FIG. 1.
Figure 5:
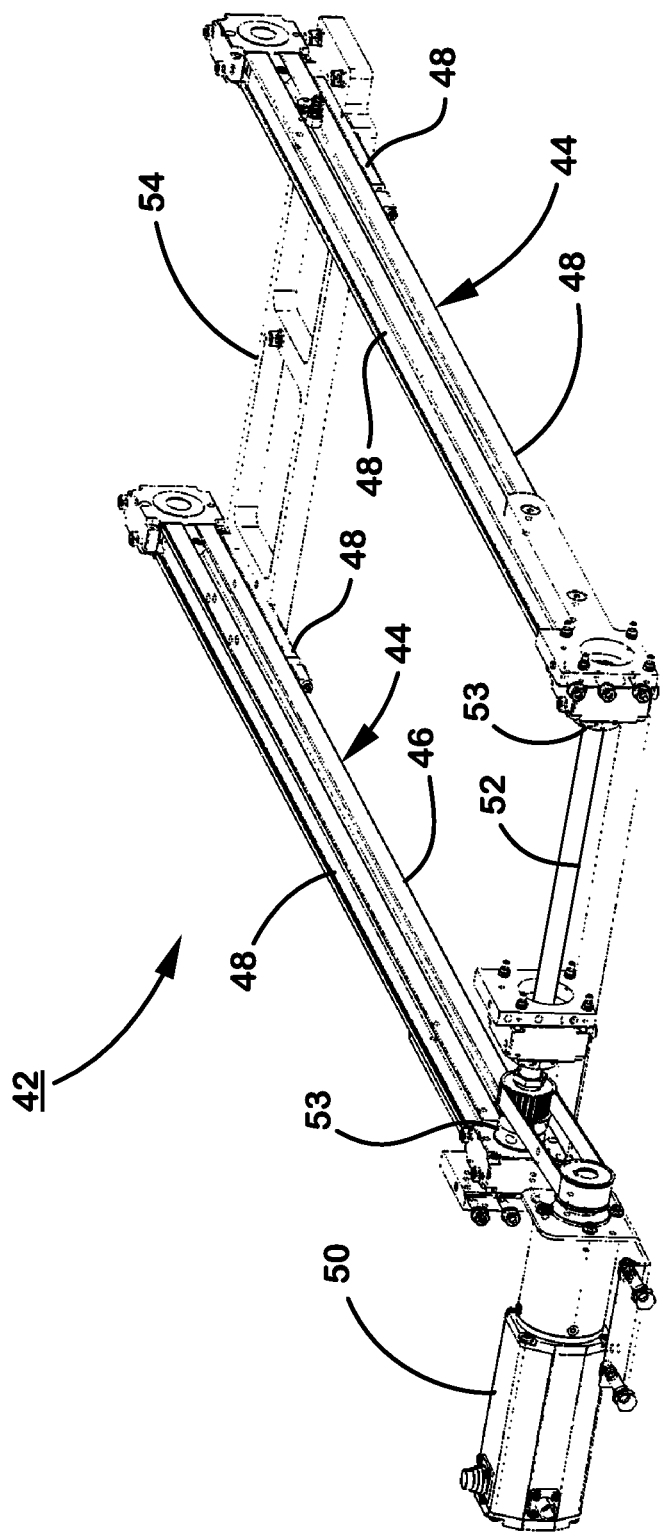
FIG. 5 is a perspective view of a connector assembly.
Figure 6:
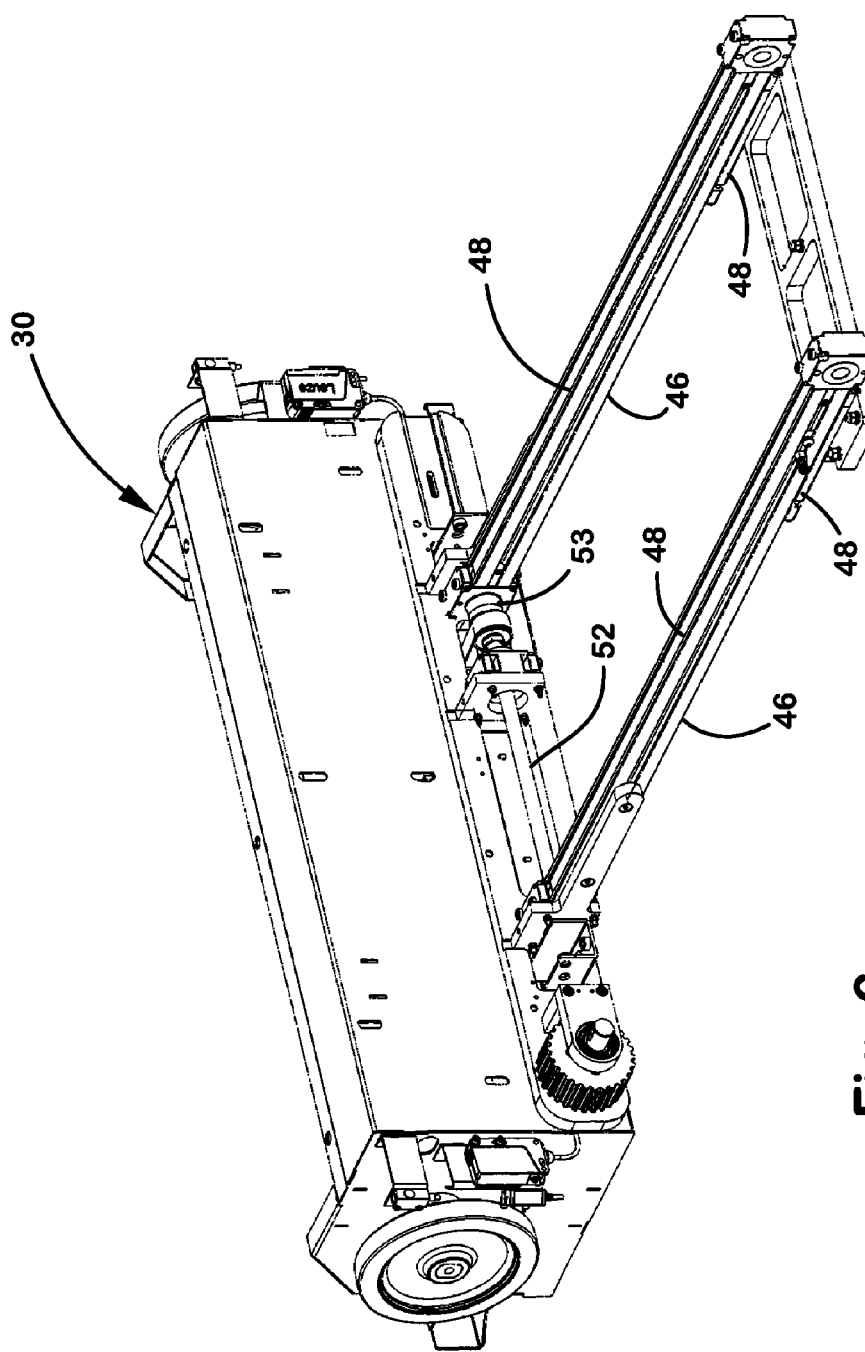
FIG. 6 is a perspective view of a chassis portion showing interface to the connector assembly in FIG. 5.
Figure 7:
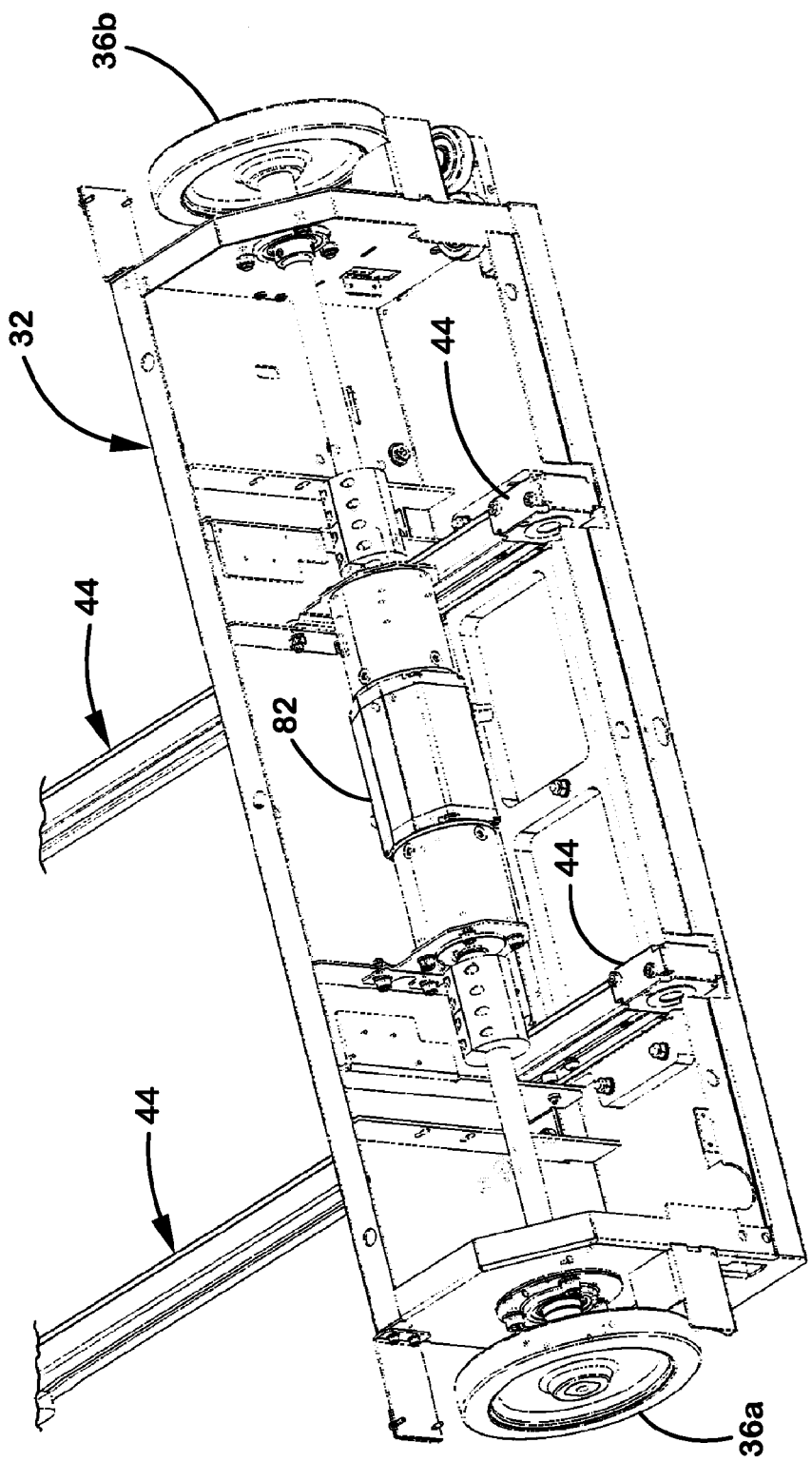
FIG. 7 is a perspective view of the other chassis portion, with the cover removed to reveal internal details thereof showing interface to the connector assembly in FIG. 5.
Figure 8:
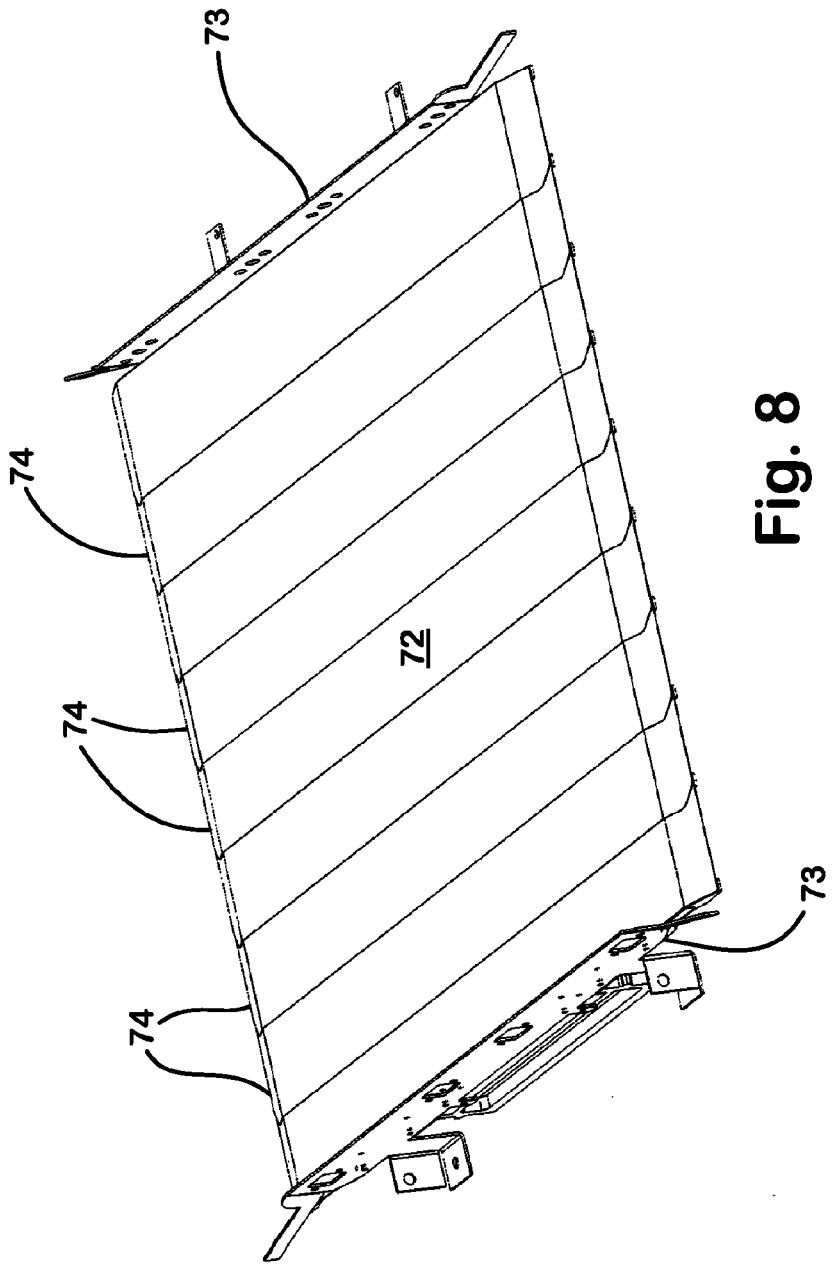
FIG. 8 is a perspective view of an article-carrying area taken from above and the side of the shuttle.
Figure 9:
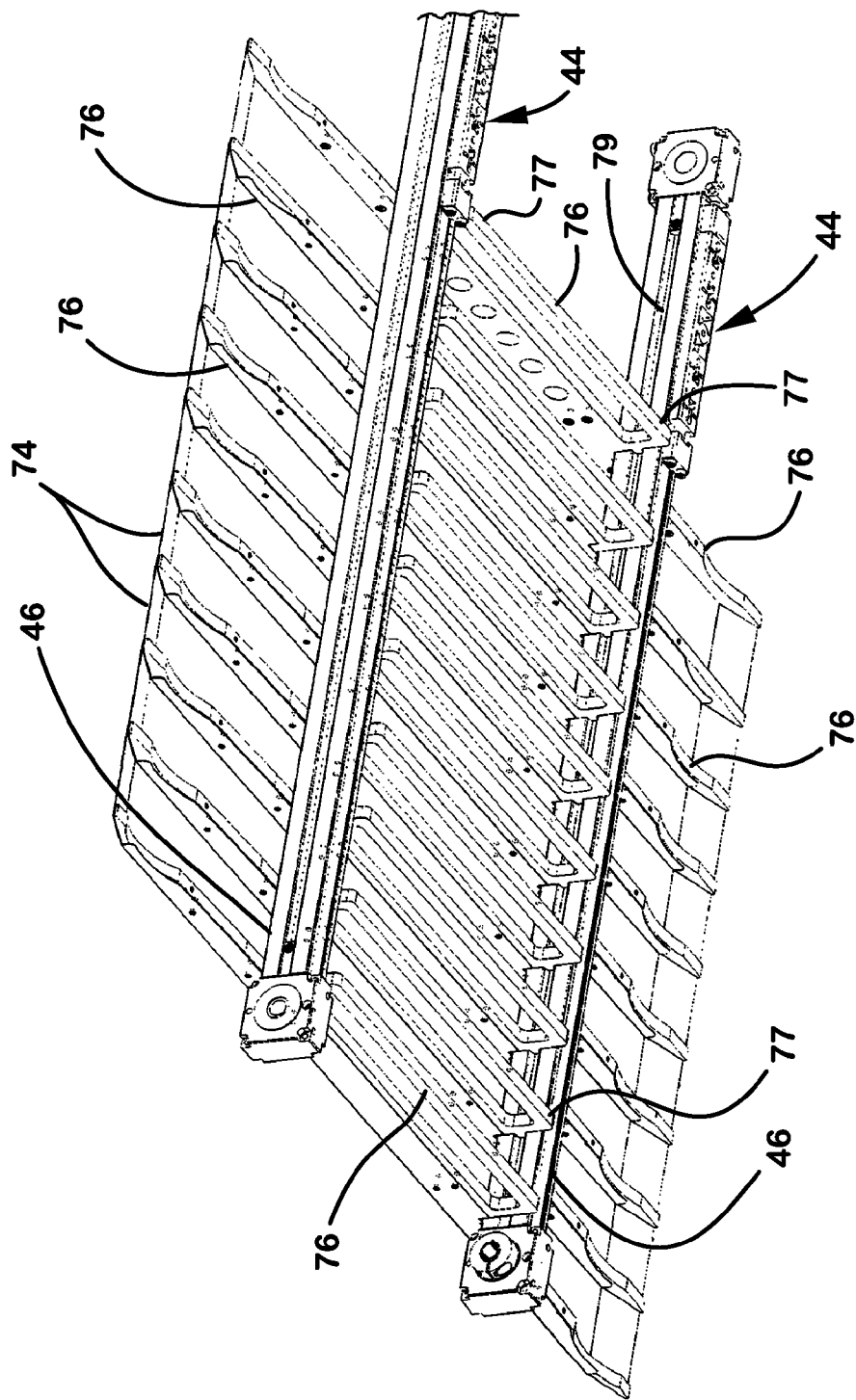
FIG. 9 is a perspective view of the article-carrying area in FIG. 8 taken from below and the side of the shuttle.
Figure 10:
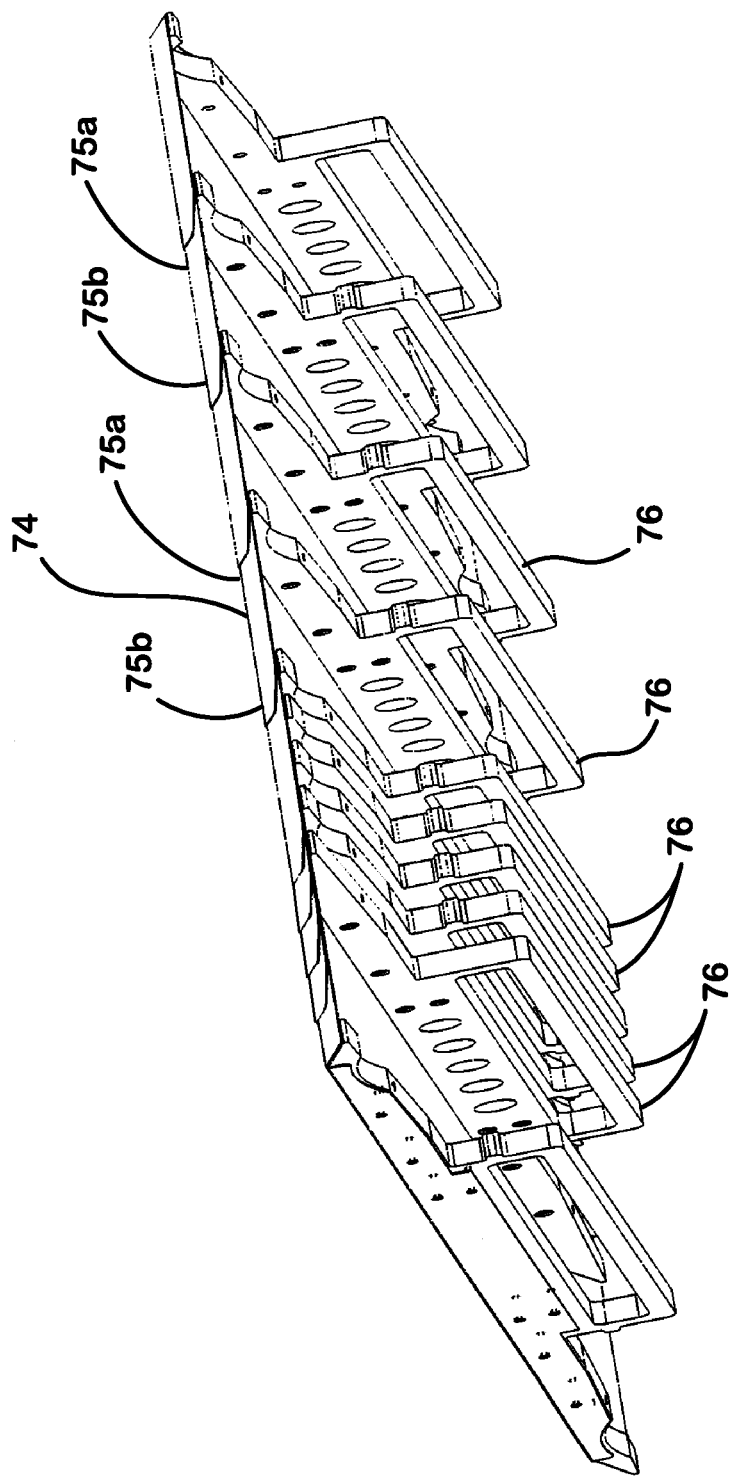
FIG. 10 is the same general view of the article-carrying area in FIG. 9 showing retraction of the article support surface.

Referring now to the drawings and the illustrative embodiments depicted therein, a shuttle 20 is provided for use in a warehouse having a runway 24 made up of rails 24a, 24b for supporting shuttle 20 for movement along the runway and a plurality of article spaces, such as shelves 26, or the like, extending along and adjacent to runway 24 (FIG. 1) on both sides of runway 24. Warehouse 22 may be a three dimensional warehouse of the type disclosed in commonly assigned U.S. Patent Application Publication No. 2011/0008137 A1, published Jan. 13, 2011, by Shin Yamashita, which is a national filing in the U.S.A. of International patent application PCT/JP2008/065892 entitled Automated Three Dimensional Warehouse, the disclosure of which is hereby incorporated herein by reference.

Shuttle 20 includes a chassis 28 that is made up of a first chassis portion 30, a second chassis portion 32 and an article-carrying area 38 between chassis portions 30, 32. A pair of first running wheels 34a, 34b are provided on first chassis portion 30 to partially support shuttle 20 and to facilitate movement along runway 24. A pair of second running wheels 36a, 36b are provided on chassis 28 spaced from first running wheels 34a, 34b to partially support shuttle 20 and to facilitate movement along runway 24. In the illustrated embodiment, second running wheels 36a, 36b are mounted to second chassis portion 32, but could alternately be mounted to a connector assembly 42. A pair of extendable arms 40a, 40b is mounted to chassis 28 in order to transfer an article between one of shelves 26 and article-carrying area 38. Arms 40a, 40b are extendable from chassis 28 in either lateral direction from the chassis to either retrieve an article from one of shelves 26 or to transfer an article from article-carrying area 38 to a shelf. Arms 40a, 40b are retractable after being extended. Arms 40a, 40b may be elastic members that are capable of transferring multiple articles deep on shelves 26 of the type disclosed in commonly assigned U.S. Patent Application Publication No. 2011/0008138 A1, published Jan. 13, 2011, by Shin Yamashita, which is a national filing in the U.S.A. of International Patent Application Publication No. WO 2010/049987 A1 entitled Transfer Shuttle for Automated Warehouse, the disclosure of which is hereby incorporated herein by reference.

Shuttle 20 further includes a connector assembly 42 that connects first and second chassis portions 30, 32. Arm 40a is mounted to first chassis portion 30. Arm 40b is mounted to second chassis portion 32. Connector assembly 42 can vary the spacing between first and second chassis portions 30, 32. By varying the spacing between the chassis portions, the spacing between arms 40a, 40b is also varied. This allows arms 40a, 40b to engage articles of different widths; i.e., the article dimension perpendicular to arms 40a and 40b. In the illustrated embodiment, a high level warehouse control 89 stores the dimensions of each article being transferred by shuttle 20. When shuttle 20 is commanded to store or retrieve a particular article, warehouse control 89 retrieves from memory the corresponding width dimension for that article and instructs a control 80 on board shuttle 20 to adjust connector assembly 42 to a position to provide the corresponding separation between arms 40a, 40b plus a tolerance. When that article is stored or retrieved, warehouse control 89 instructs control 80 to adjust connector assembly 42 for the width of the next article to be stored or retrieved. While, in the illustrated embodiment, control 80 adjusts connector assembly 42 in response to data stored in warehouse control 89, it could, alternatively, adjust connector assembly 42 by sensing the width of the article, such as by sensors, on arms 40a, 40b, or the like. Other variations may be apparent to the skilled artisan.

In one embodiment, connector assembly 42 is made up of two spaced apart linear actuators 44a, 44b extending between first and second chassis portions 30, 32. Of course, a different number of linear actuators could be used. Each linear actuator 44a, 44b is made up of a rigid rail 46 that is fixedly connected to first chassis portion 30 and is slideably connected to second chassis portion 32, such as with a slide bearing (not shown) that is mounted to the second chassis portion and receives rail 46. A continuous belt 48 travels in a circular track along and around rail 46 and attaches to a bracket 54 that forms a lower part of second chassis portion 32. A spacing motor 50 is connected to both linear actuators 44a, 44b by way of a shaft 52 in order to rotate pulleys 53 that move belts 48 in unison. Spacing motor 50 may be a brushless DC servomotor that is commercially available from various sources. Each belt 48 is connected to bracket 54 of second chassis portion 32, wherein operating of spacing motor 50 causes belts 48 to move second chassis portion 32 with respect to first chassis portion 30. Rails 46 of linear actuators 44a, 44b extend outwardly of second chassis portion 32. An end member, such as a bumper 56, is connected to the portions of rails 46 that extend outwardly of second chassis portion 32. In the illustrated embodiment, linear actuators 44a, 44b are commercially available from Macron Dynamics, Inc.

Extendable arms 40 include a drive assembly 58 for extending and retracting arms 40a, 40b. Drive assembly 58 includes a first drive 60 associated with arm 40a, a second drive 62 associated with arm 40b, an arm drive motor 63, and a shaft, such as a spline shaft 64 interconnecting motor 63 with first and second drives 60, 62. Drive assembly 58 further includes a universal joint 68 connected with shaft 64 to accommodate flexing between first and second chassis portions 30, 32. Not only is some flexing a result of the use of an adjustable connector assembly 42 joining chassis portions 30, 32, it beneficially ensures that all four wheels 34a, 34b, 36a, 36b will make contact with runway 24. Shaft 64 is supported at an end opposite universal joint 68 by a universal bearing 70 to accommodate three (3) degrees of movement of shaft 64. Shaft 64 extends beyond bearing 70 in order to allow the shaft to extend beyond second chassis portion 32 as chassis portions 30, 32 are moved toward each other.

In the illustrated embodiments, article-carrying area 38 includes an article support surface 72 between arms 40a, 40b. Article support surface 72 is expandable and contractible in response to varying of the spacing between arms 40a, 40b. This may be accomplished by article support surface 72 being defined by a plurality of overlapping plates 74. Most plates 74 are supported at one side portion 75a by a support bar 76 and at the opposite side portion 75b by resting on an adjacent one of plates 74. Plates 74 adjacent to one of arms 40a, 40b are supported at the respective arm 40b, 40b, such as by a bracket 73. Support bars 76 are supported at opposite end portions 77, which are slideably received in slots 79 in rail 46 of connector assembly 42. One or more flexible bands 78, to which support bars are connected at regular intervals, are supported at opposite ends with chassis portions 30, 32. Flexible bands 78 maintain a maximum spacing between support bars 76 to ensure that side portion 75b does not become separated from its adjacent plate 74 when chassis portions 30, 32 move apart from each other, while allowing the plates to move toward each other as the chassis portions move toward each other.

Figure 11:
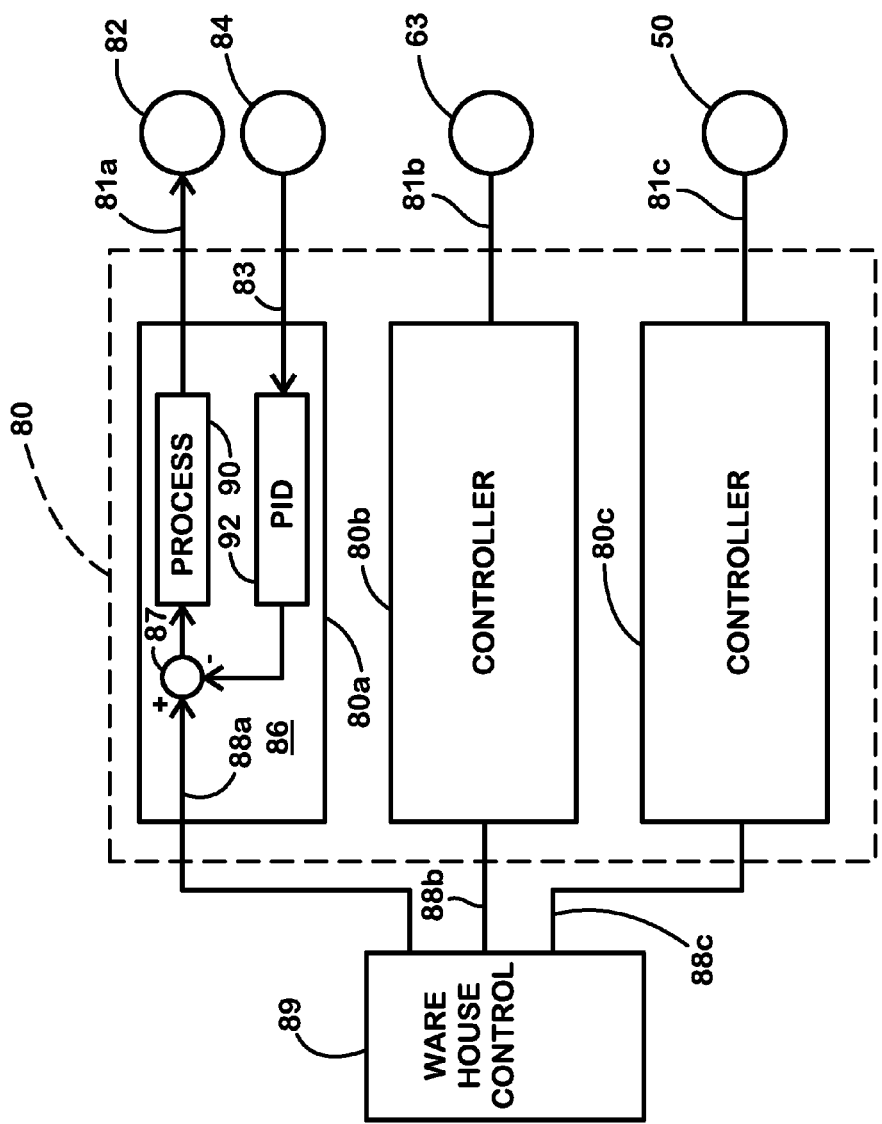
FIG. 11 is a schematic block diagram of a control system.

Shuttle 20 includes a control 80 (FIG. 11). Control 80 has a first logical section 80a that produces a first output 81a for effecting rotation of first running wheels 34a, 34b, a second logical section 80b that produces a second output 81b for effecting change in extension and retraction of arms 45 and a third logical section 80c that produces a third output 81c for effecting change in spacing between first and second chassis portions 30, 32. First output 81a goes to a drive motor 82 in second chassis portion 32 for rotating one or both running wheels 36a, 36b. Second output 81b operates arm drive motor 63. Third output 81c operates spacing motor 50. An encoder input 83 to control 80 is provided by an encoder 84 that tracks movement of shuttle 20. Encoder input 83 is positioned on first chassis portion 30 to track rotation of first running wheels 34a, 34b. In the illustrated embodiment, control 80 resides on the associated shuttle 20 and responds to commands illustrated schematically at 88a, 88b, 88b issued by a higher level control, such as warehouse control 89, to go to a particular shelf location and either store or retrieve an article of a particular width. In the illustrated embodiment, control 80 is made up of multiple microprocessor-based programmable logic controllers (PLC) of the type that are readily commercially available. However, control 80 may be made up of a custom designed circuit, or the like.

Control 80 defines a feedback loop 86 to produce first output 81a. Feedback loop 86 receives input 88a that provides the command from warehouse control 89 from which first longitudinal section 80a can determine a need to travel to a particular position along runway 44. Feedback loop 86 includes a node 87 that subtracts from input 88a the encoder input 83 that is processed with a proportion, integral, derivative (PID) circuit 92. The result of the comparison at node 87 is processed through the parameters of system process 90 to provide output 81a. This causes the center of shuttle 20 and, therefore, the center of arms 40 to travel to the commanded destination or position. Advantageously, feedback loop 86 is self-compensating for variation in spacing between first and second chassis portion 30, 32. This is a result of the fact that output 81a is supplied to drive motor 82, which is in second chassis portion 32, and encoder 84 is on first chassis portion 30. Therefore, as the chassis portions move with respect to each other, the position of the shuttle as detected by encoder 84 is adjusted for the purposes of feedback loop 86 to take into account the change in length of the shuttle. Indeed, it is possible to give a "no-move" command to control 80 in which the third output 81c is adjusted to adjust the length of the shuttle, but no command is given to change output 81b. However, the change in length of the shuttle will cause encoder 84 to respond as if the shuttle has moved, which will be acted on by feedback loop 86 to adjust the actual centerline location of the shuttle, and, hence, arms 40.

Figure 12:
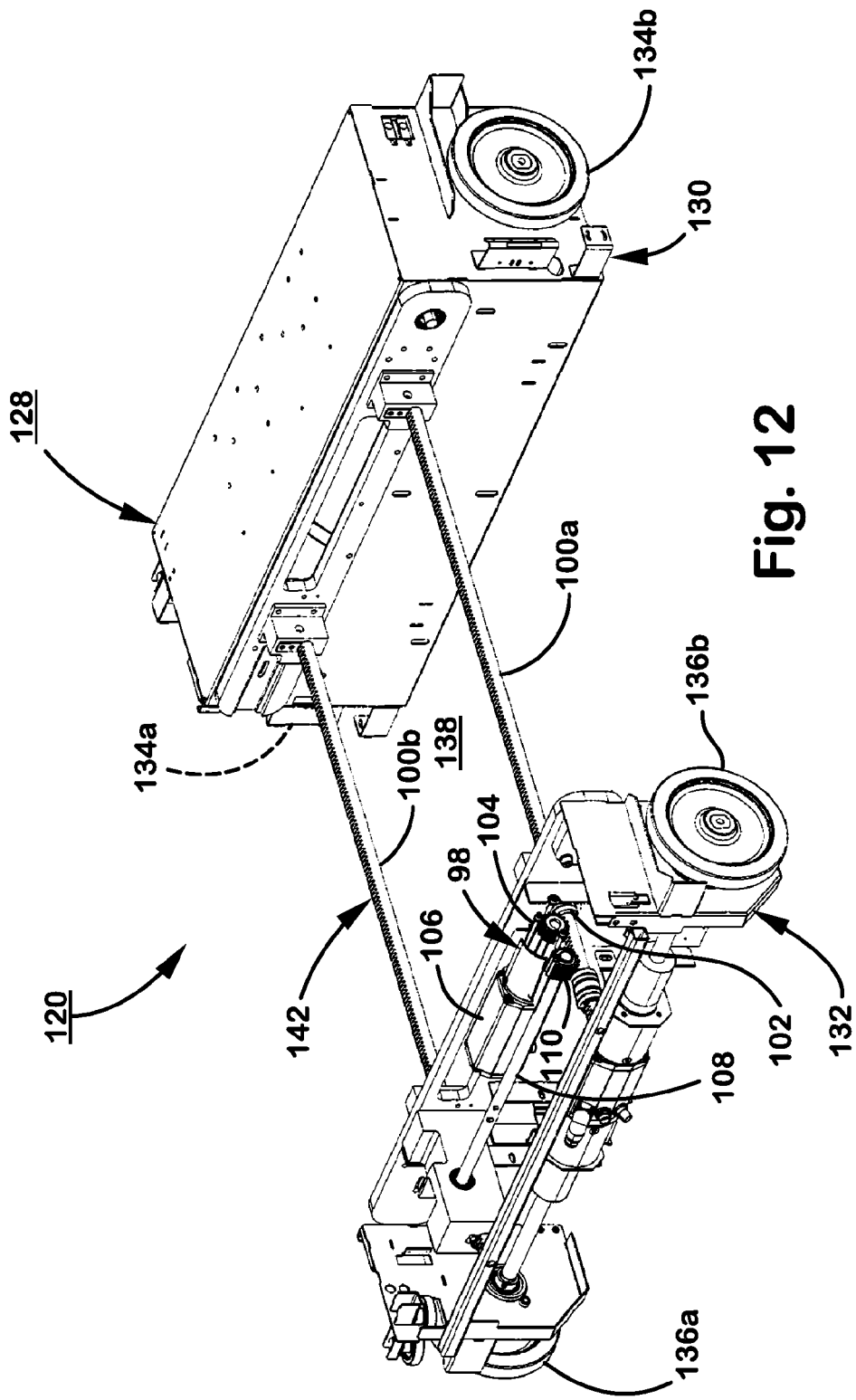
FIG. 12 is a perspective view showing an alternative embodiment of a shuttle according to another embodiment of the invention.
Figure 13:
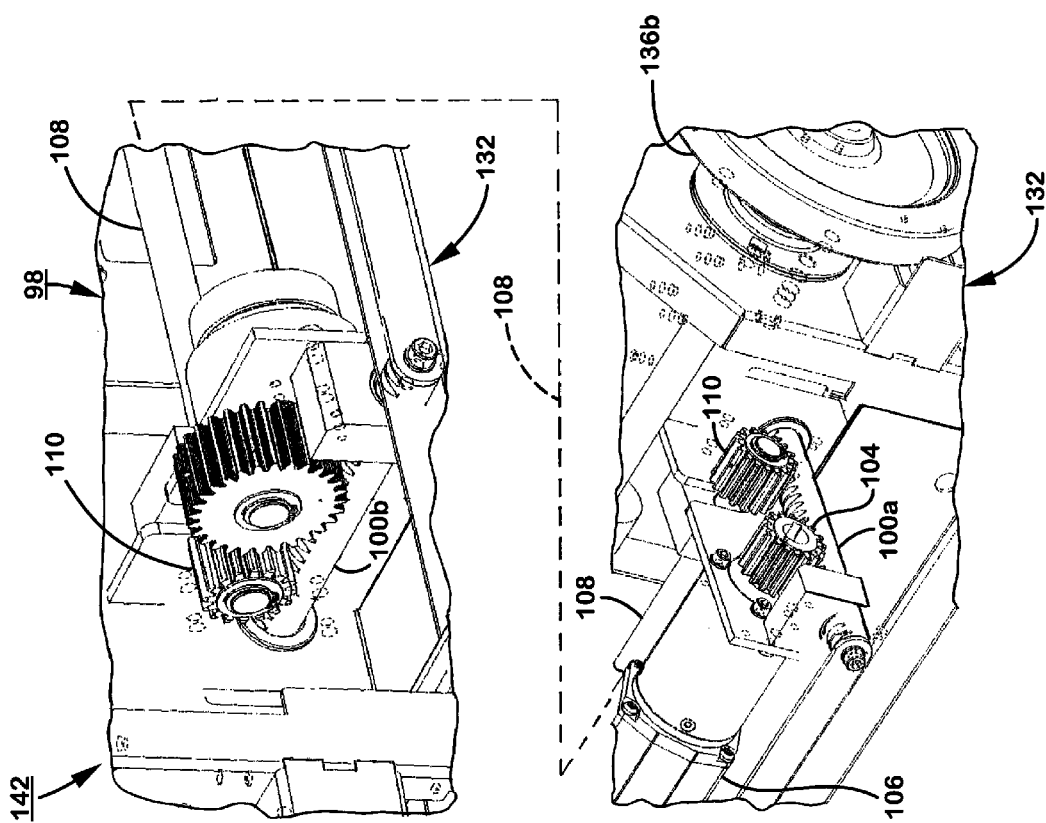
FIG. 13 is an enlarged perspective view of a connector assembly used in the shuttle in FIG. 12.

In an alternative embodiment, a shuttle 120 includes a chassis 128 having a first chassis portion 130 and a second chassis portion 132 (FIGS. 12 and 13). A set of first running wheels 134a, 134b are provided at first chassis portion 130 and a second set of running wheels 136a, 136b are provided spaced from first running wheels 134a, 134b, such as at second chassis portion 132 or other locations on chassis 128. An article-carrying area, generally shown at 138, is provided between first and second chassis portions 130, 132. A pair of extendable arms (not shown) similar to arms 40 are mounted respectively to first and second chassis portions 130, 132. Shuttle 120 further includes a connector assembly 142 that connects first and second chassis portions 130, 132. Connector assembly 142 is adjustable to vary the spacing between said first and second chassis portions 130, 132 and thereby to vary the spacing between the extendable arms to engage articles of different widths.

Connector assembly 142 is in the form of a rack and pinion assembly 98. Rack and pinion assembly 98 includes a rack 100a that is fixedly connected to first chassis portion 130 and is slideably connected to second chassis portion 132. Rack and pinion assembly 98 further includes a spacing motor 106 that operates a pinion gear 104 that engages with rack 100a in order to adjust the spacing between first chassis portion 130 and second chassis portion 132. Rack and pinion assembly 98 further includes a second rack 100b. Motor 106 operates both racks 100a and 100b via a coordination shaft 108. Motor 106 operates a pinion gear 110 that is engaged with rack 100a, and a shaft 108 is rotated by rack 100a and extends to the other rack 100b via another pinion gear 110. Alternately, motor 106 could directly rotate shaft 108. A pair of friction bearings 102 provides a slideable connection between racks 100a and 100b. In this manner, as motor 106 is operated, first chassis portion 130 travels with respect to racks 100a, 100b and thereby changes the spacing between chassis portions 130, 132 to adjust the spacing between the extendable arms. Other details of shuttle 120 may be similar to those described with respect to shuttle 20.

Figure 14:
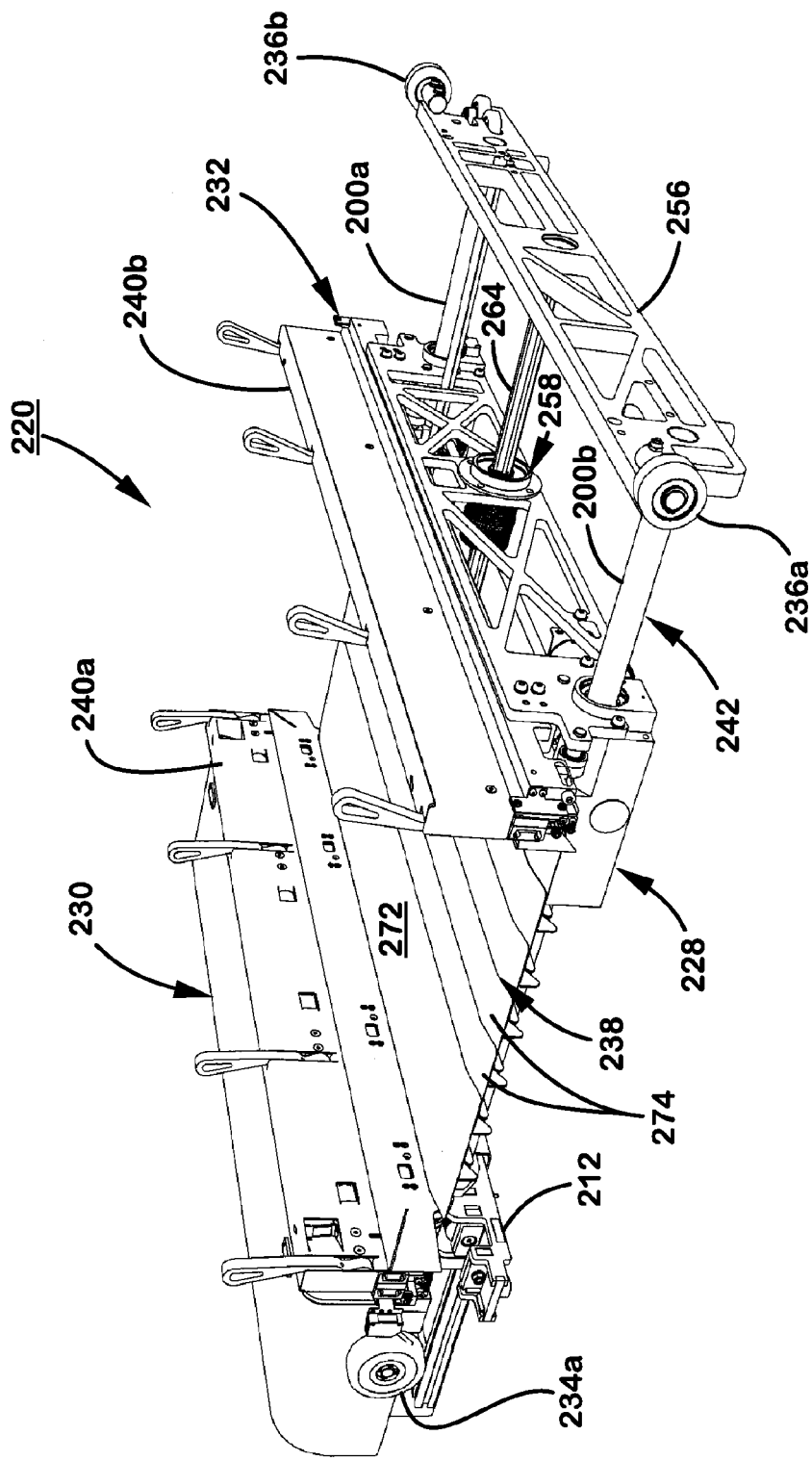
FIG. 14 is the same view as FIG. 1 of a shuttle in a warehouse according to an alternative embodiment of the invention.
Figures 15, 16:
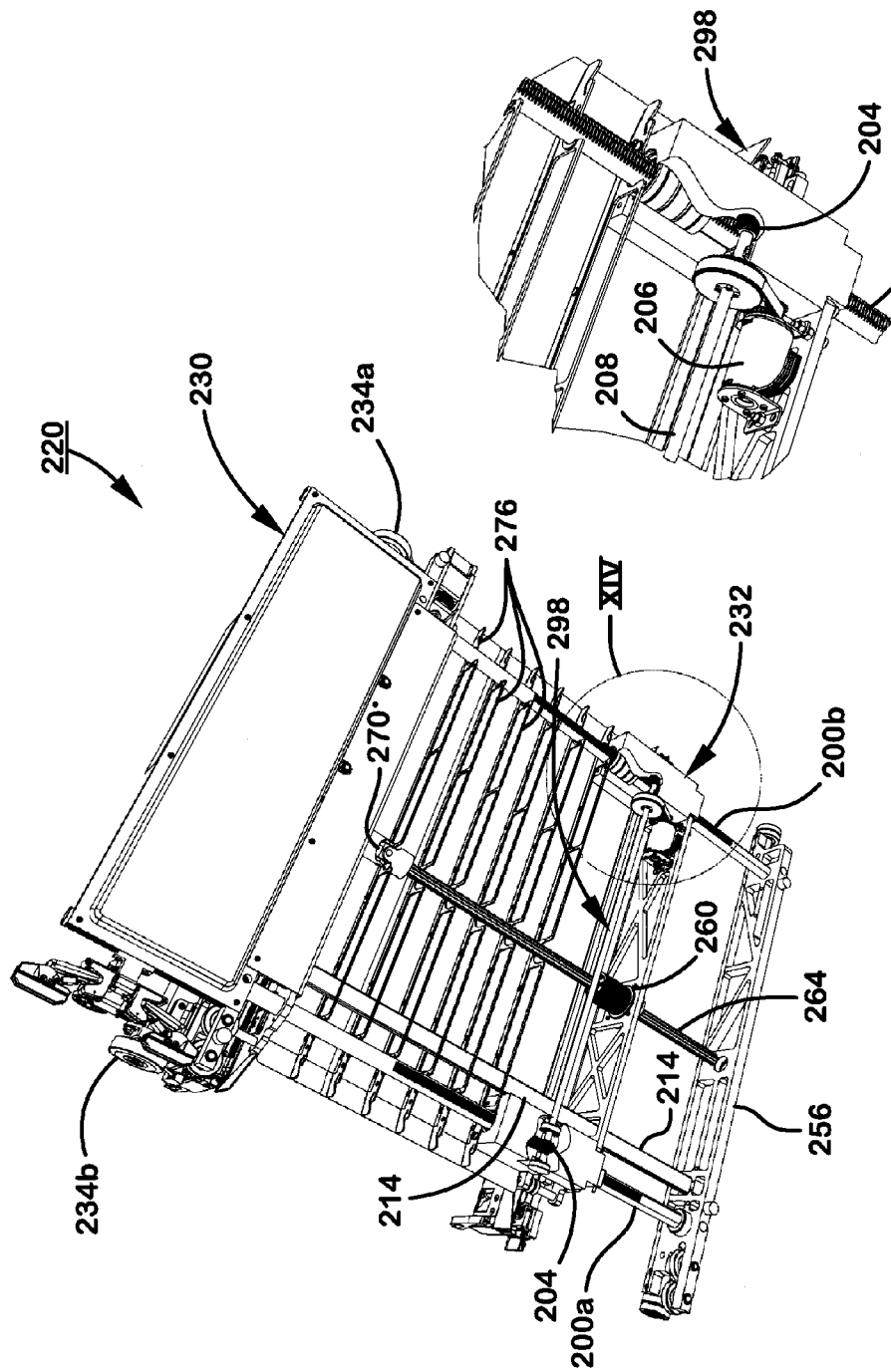
FIG. 15 is a perspective view of the shuttle in FIG. 14 taken from the underside thereof.
FIG. 16 is an enlarged view of the area designated XVI in FIG. 15.

In another alternative embodiment, a shuttle 220 for a warehouse includes a chassis 228 made up of a first chassis portion 230, a second chassis portion 232 and an article-carrying area 238 between chassis portions 230, 232 (FIGS. 14-16). First chassis portion 230 includes a set of first running wheels 234a, 234b that are adapted to travel along the runway. A pair of second running wheels 236a, 236b are mounted on chassis 228 spaced from first running wheels 234a, 234b. A pair of extendable arms 240a, 240b are mounted to chassis 228 in order to transfer a article between one of the shelves and article-carrying area 238. In the illustrated embodiment, arms 240a, 240 are provided according to the disclosure of commonly assigned U.S. patent application Ser. No. 61/471,358 filed Apr. 4, 2011, by Philipp J. Hortig et al. entitled TELESCOPING MECHANISM AND METHOD OF EXTENDING AND RETRACTING A TELESCOPING MECHANISM, the disclosure of which is hereby incorporated herein by reference. Chassis 228 may further include an end-of-aisle emergency brake 212 that is provided according to the disclosure of commonly assigned U.S. patent application Ser. No. 61/471,326 filed Apr. 4, 2011, by Philipp J. Hortig et al. entitled AISLE EMERGENCY BRAKE FOR RAIL-GUIDED VEHICLE, the disclosure of which is hereby incorporated herein by reference.

Shuttle 220 further includes a connector assembly 242 connecting said first and second chassis portions 230, 232. Extendable arm 240a is mounted to first chassis portion 230, and extendable arm 240b is mounted to second chassis portion 232. Connector assembly 242 is adapted to vary the spacing between said first and second chassis portions 230, 232 thereby varying the spacing between arms 240a, 240b to engage articles of different widths. In the illustrated embodiment, connector assembly 242 is made up of a rack and pinion assembly 298 made up of a plurality of spaced apart rack bars 200a, 200b that are fixedly connected to first chassis portions 230 and are slideably connected to second chassis portion 232.

Rack and pinion assembly 298 further includes a plurality of pinion gears 204, each engaged with gear teeth machined into a corresponding rack bar 100a, 100b. A shaft 208 coordinates movement of pinion gears 204 so that extendable arm 240b on chassis portion 232 maintains its parallel orientation to extendable arm 240a on first chassis portion 230. A spacing motor 206 mounted to second chassis portion 232 rotates shaft 208 thereby causing pinion gears 204 to travel along rack bars 200a, 200b. In the illustrated embodiment, motor 206 is a DC servo motor thereby allowing precise positioning of second chassis portion 232 with respect to first chassis portion 230. However, other types of spacing motor, such as a variable frequency motor, may be used in combination with an encoder. A trough 214 extends generally the length of connector assembly 242 parallel to rack bar 200a to support an energy chain (not shown) that extends from first chassis portion 230 to second chassis portion 232 to supply actuation currents to spacing motor 206 from a controller (not shown in FIGS. 14-16) in first chassis portion 230. Such energy chain is well known in the art and folds upon itself in order to accommodate relative motion between chassis portions 230, 232. Various other techniques could be used to supply actuation currents to motor 206. Alternatively, spacing motor 206 could be positioned in first chassis portion 230 and mechanically coupled to shaft 208.

Shuttle 220 further includes a set of second running wheels 236a, 236b that are spaced from first running wheels 234a, 234b. In the illustrated embodiment, wheels 236a, 236b are mounted to an end member 256 that forms the end of connector assembly 242. However, wheels 236a, 236b could alternatively be mounted to second chassis portion 232 or other locations on chassis 228.

An arm drive assembly 258 is provided for extending and retracting arms 240a, 240b. Drive assembly 258 includes a first drive 260 associated with one of the arms and a second drive (not shown) associated with the other of the arms. A motor 463 (not shown in FIGS. 14-16) drives second drive in the manner set forth in the provisional application referred to above. A spline shaft 264 interconnects motor 463 with first drive 260 and the second drive. A universal joint 270 is connected with shaft 264 to accommodate flexing between first and second chassis portions 230, 232.

Article-carrying area 238 includes an article support surface 272 between arms 240a, 240b that is expandable and contractible in response to varying of the spacing between the arms. Article support surface 272 is defined by a plurality of overlapping plates 274 that are supported by support bars 276 which are interconnected by a flexible band (not shown) in the same manner as plates 74 are supported.

Figure 18:
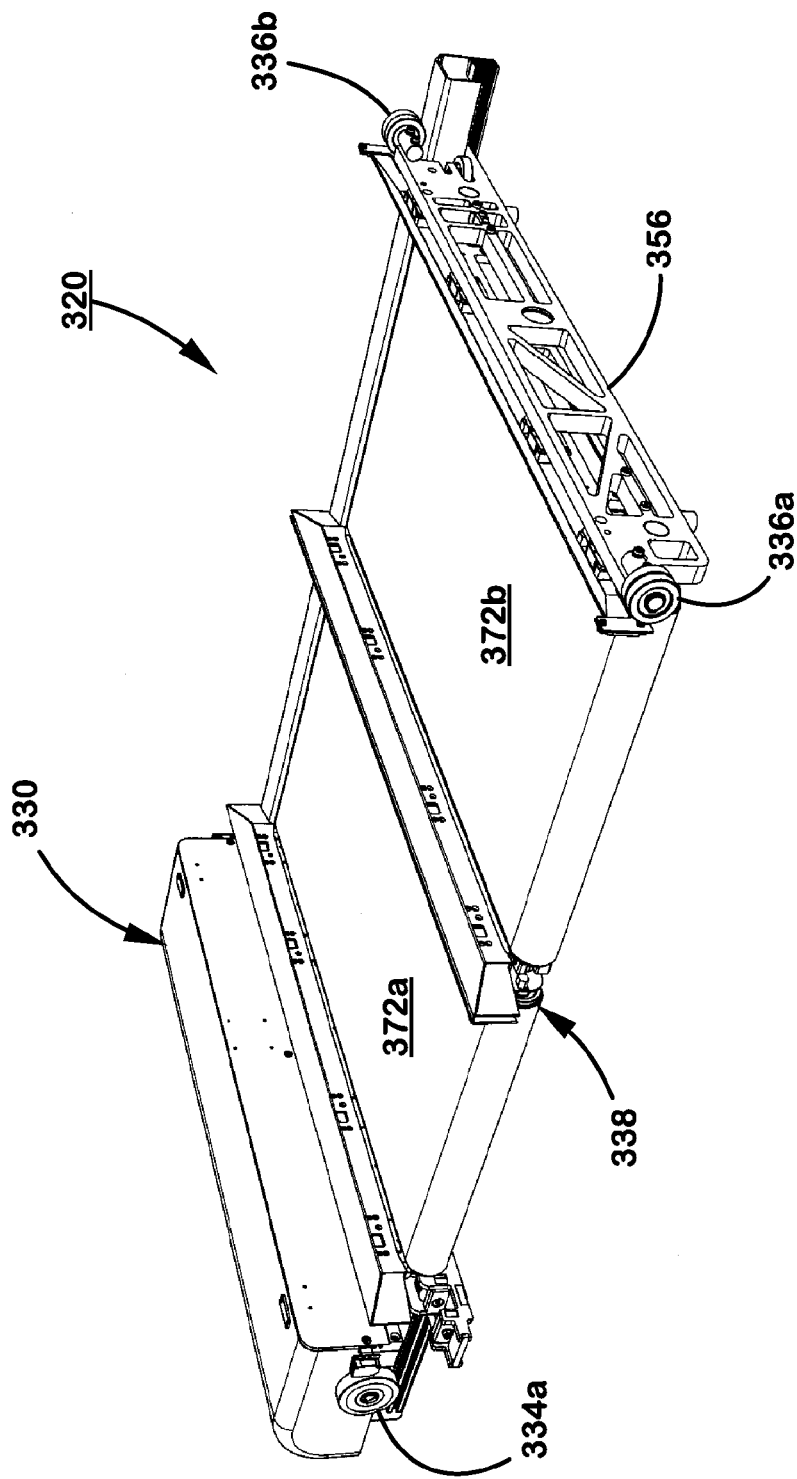
FIG. 18 is the same view as FIG. 14 of a replenishment shuttle in a warehouse according to an alternative embodiment of the invention.
Figure 19:
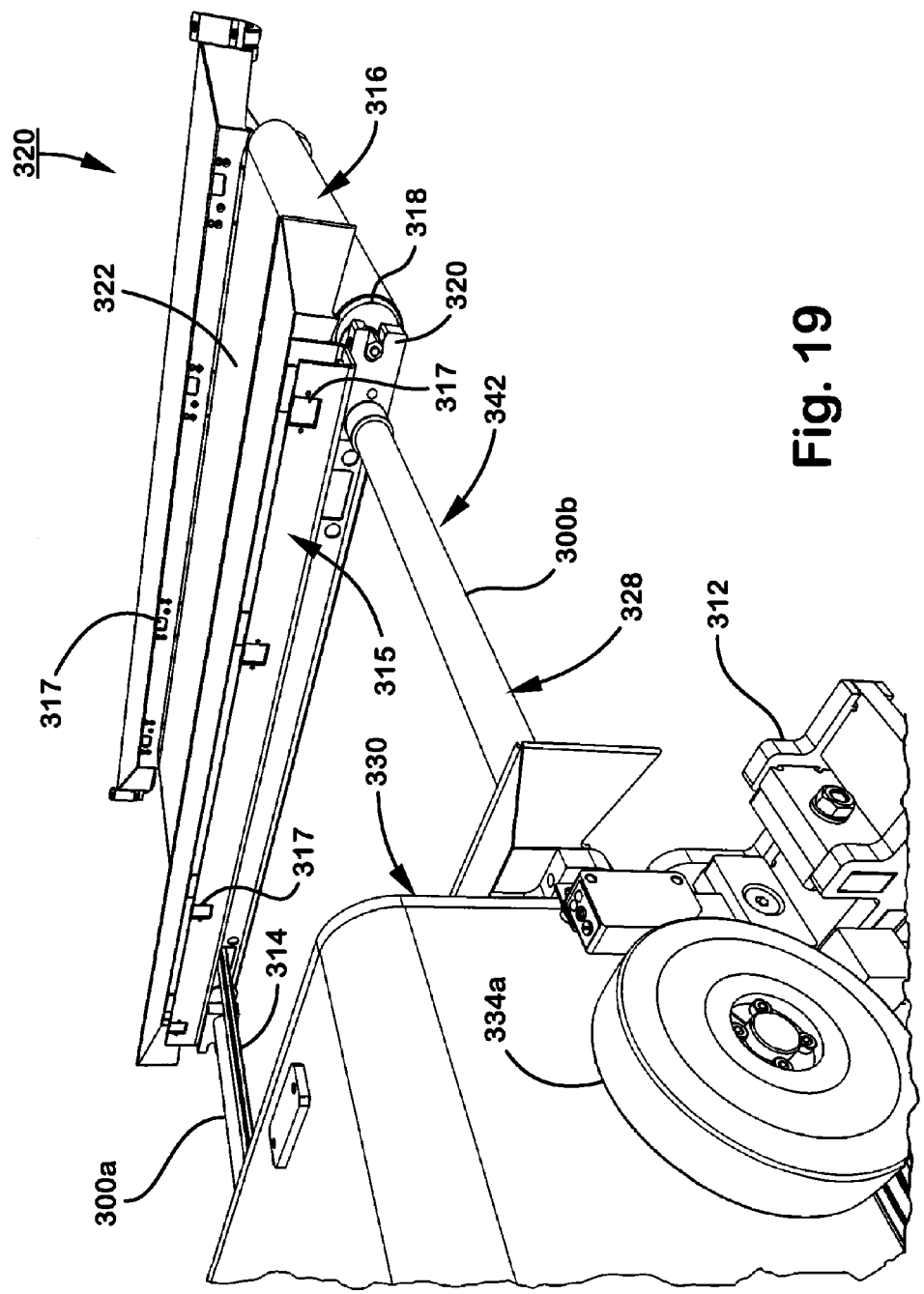
FIG. 19 is a perspective view of the replenishment shuttle in FIG. 18 taken from a different direction.

Another alternative embodiment of a shuttle 320 for a warehouse includes a chassis having first chassis portion 330 and a connector assembly 342 connected to first chassis portion 330 for supporting one or more powered conveyor assemblies 316 (FIGS. 18 and 19). Connector assembly 342 is made up of at least two spaced apart tubular members 300a, 300b that support an article-carrying area 336 having article support surfaces 372. Because article-carrying area 336 is of fixed size, tubular members 330a, 330b may be plain tubes. Tubular members 330a, 330b support two or more axle retainer brackets 320. Shuttle 320 has an end member 356 that supports wheels 336a, 336b.

Each axle retaining bracket 320 retains opposite rollers that support a driven belt 322. One roller is a powered roller 318, such as a motorized roller of the type known in the art. In the illustrated embodiment, two powered conveyor assemblies 316 are illustrated and are separated by a center console 315. Console 315 has wedge-shaped ends in order to help guide individual articles on one of the conveyor belts 322. Console 315 may also include one or more article sensors 317 for use in properly positioning an article on the respective belt. It should be understood that some embodiments may exclude a center console to allow larger articles to be handled by one or more conveyor assemblies 316. By using two or more small conveyor assemblies 316, shuttle 320 may be able to handle multiple small articles or one larger article.

Shuttle 320 may be used along or in combination with extendable arms, such as arms 240a, 240b. If such arms are used, it will be necessary to extend and retract the arms in unison with operation with power conveyor assembly 316. Alternatively, shuttle 320 may be used without such arms because it is capable of loading articles onto its article support surface and discharging articles from the article support surface by operation of power conveyor assembly 316. One application for shuttle 320 is as a replenishment shuttle to be used to replenish articles to a manual pick station, or the like. In such application, shuttle 320 will receive articles from a powered or gravity feed conveyor, or the like, and will discharge articles to a powered or gravity feed conveyor, or chute. Other applications for shuttle 320 will be apparent to one skilled in the art.

Figure 21:
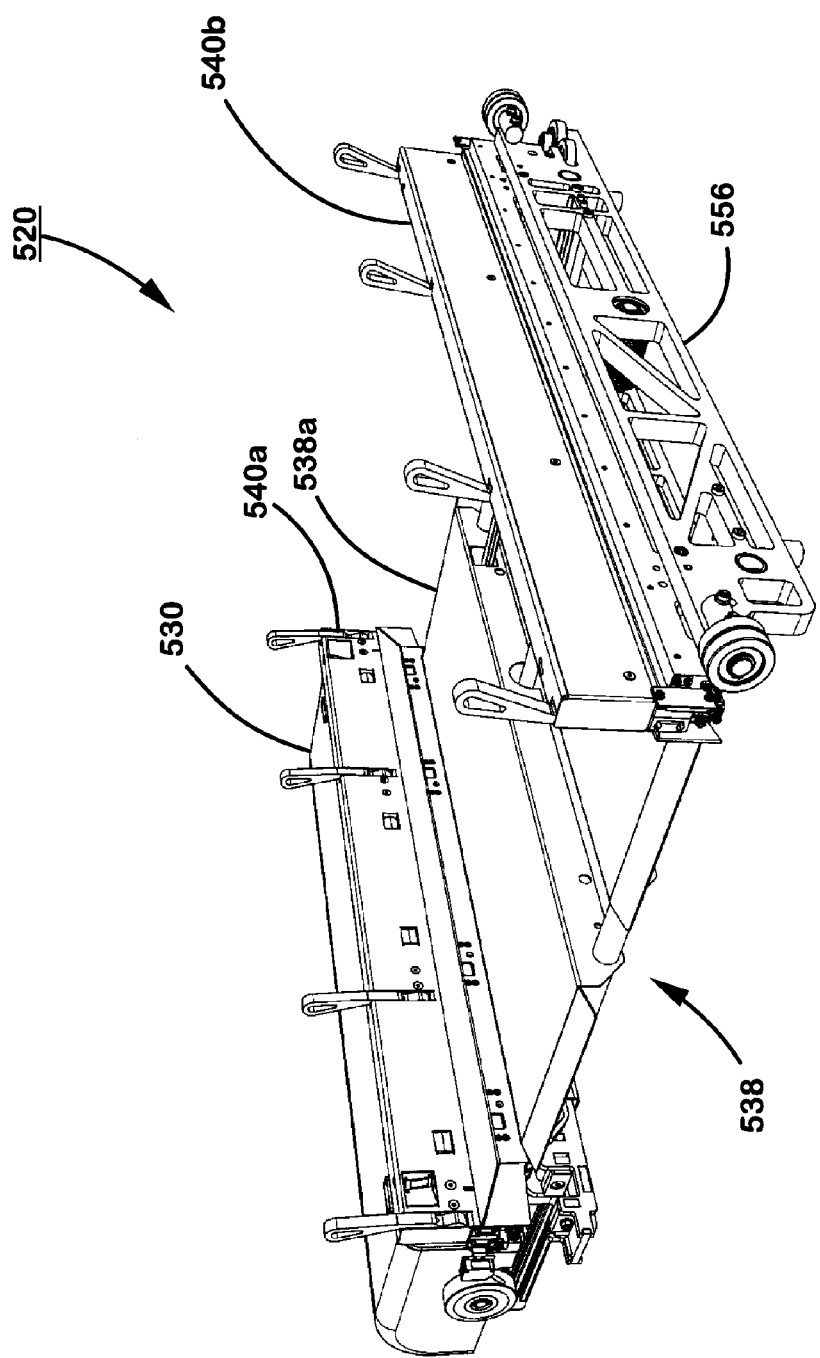
FIG. 21 is the same view as FIG. 14 of a shuttle having constant spaced arms.

Various components of the shuttles described above can be combined in various configurations. For example, a shuttle 520 may be provided in which extendable arms 540a, 540b could be used with a fixed chassis, such as one utilizing connector 342 if it is desirable to have the arms of constant spacing from each other (FIG. 21). One arm 540a is mounted to first chassis portion 530. The other arm 540b is mounted to end member 556. An article support area 538 may be provided that is made up of one or more fixed length article-carrying areas 538a, 538b, only one of which is shown in FIG. 21. Such configuration may be useful, for example, for handling articles of consistent sizes. Indeed, it can be seen that shuttles 220, 320 are illustrative of a modular shuttle arrangement in which a common first chassis portion can be combined with different connector configurations and/or different article support and transfer arrangements by utilizing a relatively small number of interchangeable parts.

Figure 17:
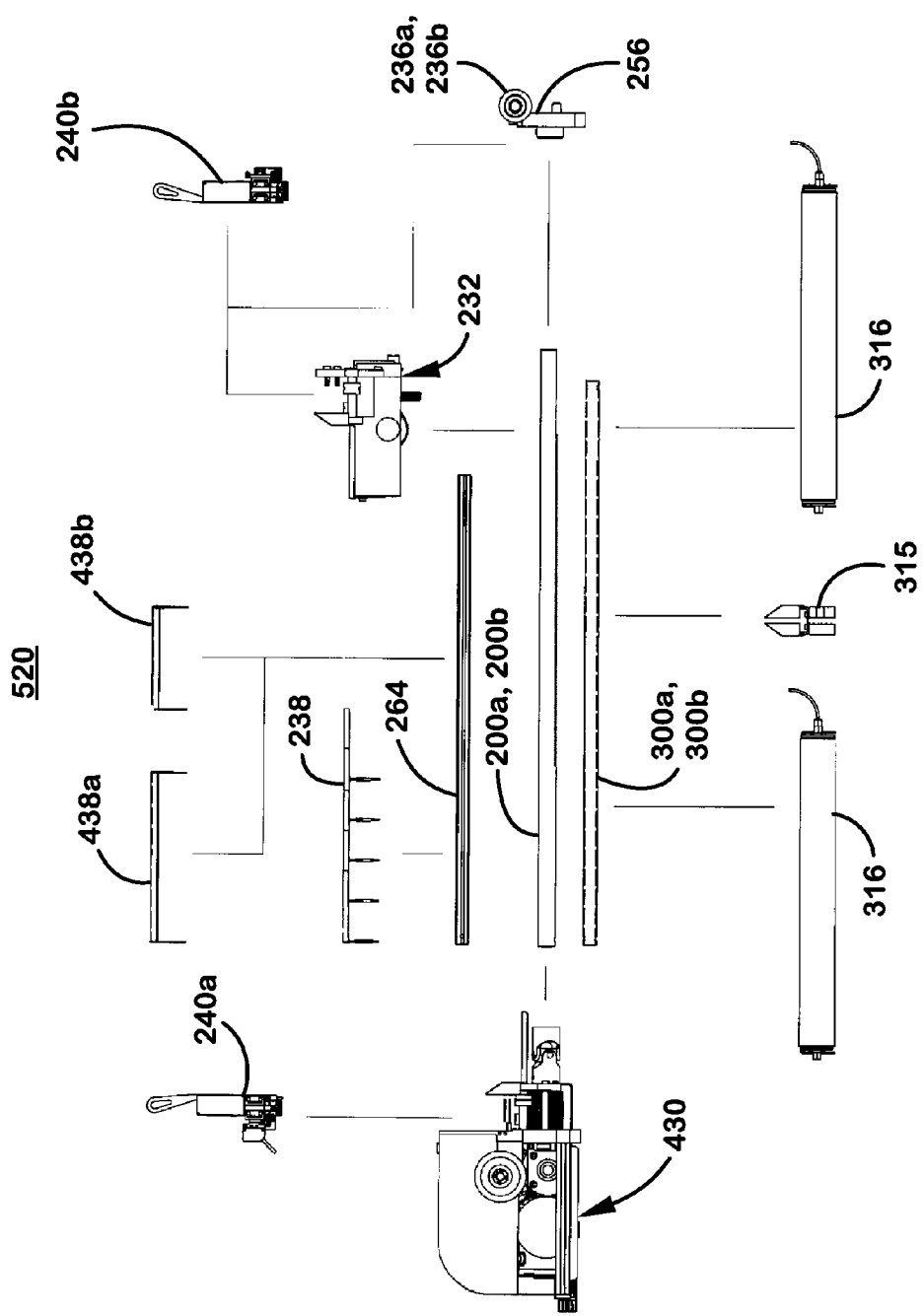
FIG. 17 is an exploded side elevation illustrating various arrangements of components of a modular shuttle assembly according to an alternative embodiment of the invention.

A shuttle kit 520 may be made up of a first chassis portion in the form of a shuttle operation module 430 (FIG. 17). Shuttle operation module may be combined with a connector made up of rack bars 200a, 200b or plain tubular members 300a, 300b. If used with rack bars 200a, 220b, a second chassis portion in the form of a carriage module 232 is used to adjust along the length of the rack bars. Also, an adjustable package-carrying area 238 is provided to accommodate relative movement between carriage module 232 and operation module 430. A pair of extendable arms 240a, 240b may be attached respectively to shuttle operation module 430 and carriage module 232 and used in combination with a shaft 264 to extend and retract the arms with motor 482 as previously described. Alternatively, arms 240a, 240b could be used with plain tubular members 300a, 300b and shaft 264. In such an arrangement, a fixed length article-carrying area 438a or 438b may be used.

Shuttle kit 520 may be used with plain tubular members 300a, 300b and one or more power conveyor assemblies 316 with or without a center console 315. In all cases, an end member 256 may be used to support wheels 236a, 236b. As previously set forth, wheels 236a, 236b could alternatively be mounted to a different portion of the chassis, such as carriage module 232.

Figure 20:
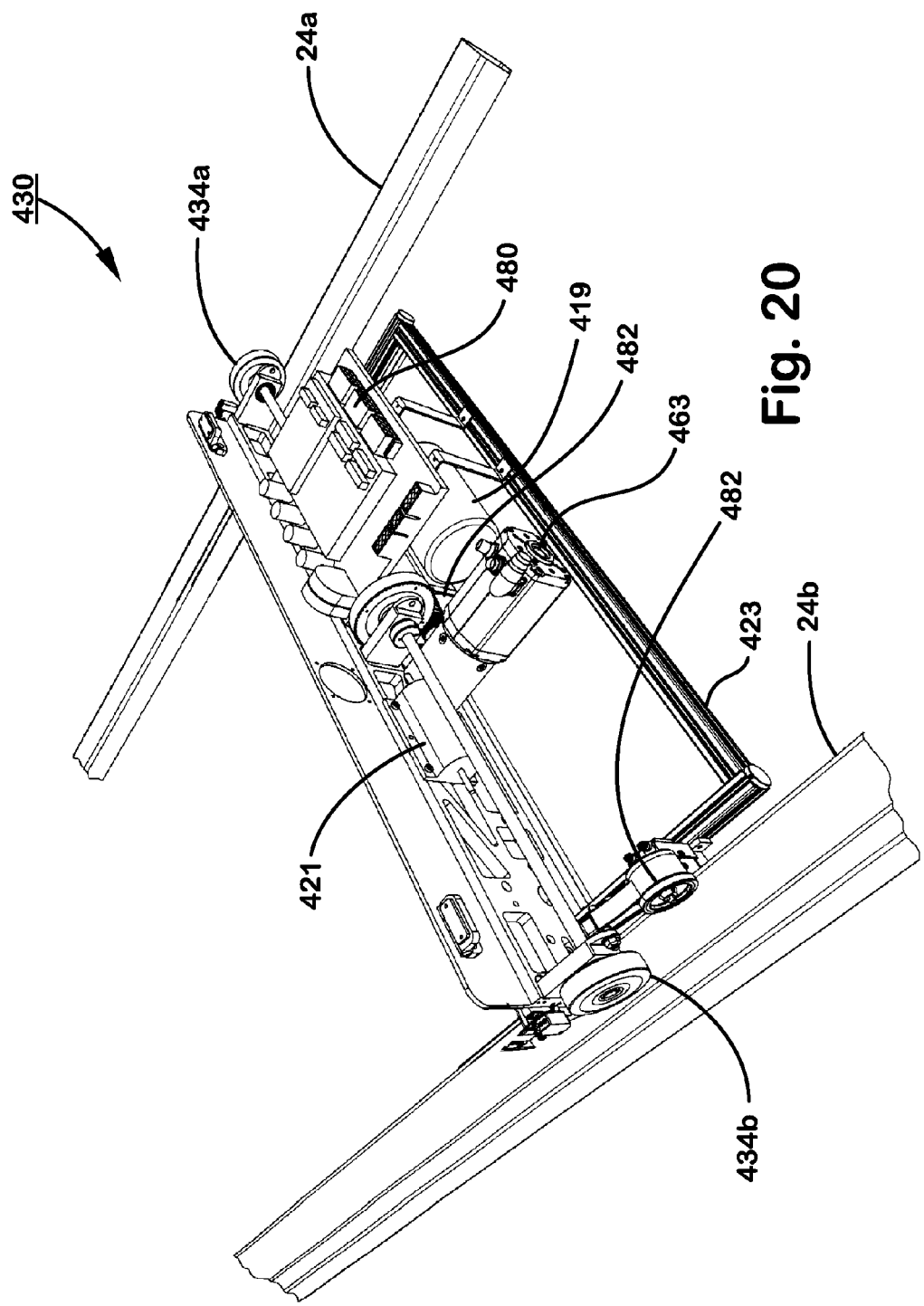
FIG. 20 is a perspective view of a shuttle operation module with the cover removed to reveal internal details thereof.

Shuttle operation module 430 includes a housing 423, an upper portion of which is removed in FIG. 20 to reveal internal details of the module. Module 430 includes a pair of running wheels 434a, 434b at least one of which is driven by a drive motor 482. An encoder 482 is operated from one of rails 24a, 24b to provide positional information to control 480. Control 480 receives commands from an off-shuttle controller in a manner similar to that previously described with respect to control 80. Control 480 provides outputs to operate drive motor 482 and, if present, arm drive motor 463 to extend and retract the arms. Also, if present, control 480 provides control currents to a pinion motor 206. A power capacitor 419 of the type known in the art is provided to continue to supply power to control 480 and motor 482 if the vehicle is separated from its power bus (not shown). It should be understood that module 430 could be operated from other power sources known in the art, such as inductive coupling, or the like. Operation module 430 may additionally include a power resistor 421 to dissipate energy from braking drive motor 482. Operation module 430 further includes a mechanical interface (not shown), such as a circular coupling, or the like, for providing a fixed engagement with rack bars 200a, 220b or plain tubes 300a, 300b.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A shuttle for a warehouse, having a runway for said shuttle and a plurality of article spaces along and adjacent to said runway, said shuttle comprising:
    a chassis made up of first and second chassis portions and an article-carrying area between said chassis portions;
    a pair of first running wheels on said first chassis portion, said first running wheels adapted to travel along the runway;

a pair of second running wheels on said chassis spaced from said first running wheels, said second running wheels adapted to travel along the runway;

a pair of extendable arms mounted to said chassis in order to transfer an article between an article space and said article-carrying area; and a connector assembly connecting said first and second chassis portions, wherein one of said arms is mounted to said first chassis portion and the other of said arms is mounted to said second chassis portion and wherein said connector assembly is adapted to vary the spacing between said first and second chassis portions and thereby varying the spacing between said arms to engage articles of different widths, a drive assembly for extending and retracting said arms, said drive assembly including a first drive associated with said one of said arms, a second drive associated with the other of said arms, another motor and another shaft interconnecting said another motor with said first and second drives, a universal joint connected with said shaft to accommodate flexing between said first and second chassis portions.

2. The shuttle as claimed in claim 1 wherein said connector assembly comprises at least one rack and pinion assembly.

3. The shuttle as claimed in claim 2 wherein said at least one rack and pinion assembly comprises a rack bar that is fixedly connected to one of said chassis portions and is slideably connected to the other of said chassis portions and a motor that operates a pinion gear engaged with said rack bar.

4. The shuttle as claimed in claim 3 wherein said at least one rack and pinion assembly comprises a spaced apart pair of rack bars wherein said motor operates a pair of said pinion gears, each engaged with one of said rack bars and a shaft coordinating operation of said pinion gears.

5. The shuttle as claimed in claim 1 wherein said article-carrying area includes an article support surface between said arms, said article support surface being expandable and contractible in response to varying of the spacing between said arms.

6. The shuttle as claimed in claim 5 wherein said article support surface is defined by a plurality of overlapping plates.

7. The shuttle as claimed in claim 1 including a control, said control having a first output for effecting rotation of said first running wheels, a second output for effecting extension and retraction of said arms and a third output of effecting spacing between said first and second chassis portions.

8. The shuttle as claimed in claim 7 including an encoder input to said control, said encoder input rotated from one of said first running wheels or said second running wheels.

9. The shuttle as claimed in claim 1 wherein said second running wheels are mounted to one chosen from said second chassis portion and said connector assembly.

10. A shuttle for a warehouse, having a runway for said shuttle and a plurality of article spaces along and adjacent to said runway, said shuttle comprising:

a chassis made up of first and second chassis portions and an article-carrying area between said chassis portions;

a pair of first running wheels on said first chassis portion, said first running wheels adapted to travel along the runway;

a pair of second running wheels on said chassis spaced from said first running wheels, said second running wheels adapted to travel along the runway;

a pair of extendable arms mounted to said chassis in order to transfer an article between an article space and said article-carrying area; and a connector assembly connecting said first and second chassis portions, wherein one of said arms is mounted to said first chassis portion and the other of said arms is mounted to said second chassis portion and wherein said connector assembly is adapted to vary the spacing between said first and second chassis portions and thereby varying the spacing between said arms to engage articles of different widths, wherein said article-carrying area includes an article support surface between said arms, said article support surface being expandable and contractible in response to varying of the spacing between said arms wherein said article support surface is defined by a plurality of overlapping plates wherein at least some of said plates are supported at one side portion by a support bar and at the opposite side portion by resting on an adjacent one of said plates.

11. The shuttle as claimed in claim 10 wherein said support bars are supported by said connector assembly.

12. The shuttle as claimed in claim 10 including a flexible band, wherein said support bars are connected with said flexible band to maintain a maximum spacing between said support bars.

13. A shuttle for a warehouse, having a runway for said shuttle and a plurality of article spaces along and adjacent to said runway, said shuttle comprising:

a chassis made up of an operation module and an article-carrying area adjacent said operation module;

said operation module comprising a pair of first running wheels, a motor that is adapted to rotate at least one of said first running wheels, an encoder adapted to sense position along the runway and a controller for receiving external commands and an input from said encoder, said controller producing an output to said motor;

a pair of second running wheels on said chassis spaced from said first running wheels, said second running wheels adapted to travel along the runway; and a connector assembly connecting said operation module and said second running wheels, said connector assembly supporting said article-carrying area wherein said connector comprises a rack bar and further including a carriage module having a pinion assembly that engages teeth in said rack bar to move said carriage module along said rack bar.

14. The shuttle as claimed in claim 13 wherein said connector comprises at least two spaced apart rack bars and wherein said pinion assembly comprises at least two pinion gears, each engaging one of said rack bars, a drive shaft connecting said pinion gears and a drive motor that is operable to rotate said pinion gears.

15. The shuttle as claimed in claim 13 including a pair of extendable arms, one mounted to said operation module and one to said carriage module.

16. The shuttle as claimed in claim 15 including a common shaft extending between said arms that is rotatable to extend and retract said arms and including another motor at said operation module that is operable to rotate said common shaft.

17. A shuttle for a warehouse, having a runway for said shuttle and a plurality of article spaces along and adjacent to said runway, said shuttle comprising:

a chassis made up of an operation module and an article-carrying area adjacent said operation module;

said operation module comprising a pair of first running wheels, a motor that is adapted to rotate at least one of said first running wheels, an encoder adapted to sense position along the runway and a controller for receiving external commands and an input from said encoder, said controller producing an output to said motor;

a pair of second running wheels on said chassis spaced from said first running wheels, said second running wheels adapted to travel along the runway; and a connector assembly connecting said operation module and said second running wheels, wherein said connector assembly comprises at least two spaced apart tubular members and including an end member joining said tubular members and supporting said second running wheels, said connector assembly supporting said article-carrying area, said article-carrying area including at least one powered conveyor assembly supported by said tubular members and including a driven belt defining an article support surface at said article-carrying area and an article-aligning rail adjacent said at least one article support surface including a plurality of article positioning sensors on said article-aligning rail that are positioned to sense articles on said article support surface.

18. The shuttle as claimed in claim 17 wherein said at least one belted section comprises at least two belted sections supported by said plain tubes.

19. The shuttle as claimed in claim 18 wherein said article aligning rail is between said belted sections.

20. The shuttle as claimed in claim 17 wherein said driven belt is supported by at least two rollers.

21. The shuttle as claimed in claim 20 wherein at least one of said rollers comprises a motorized roller driving said driven belt.

* * * * *